(12) United States Patent
Green

(10) Patent No.: US 11,505,222 B2
(45) Date of Patent: Nov. 22, 2022

(54) RAIL TRANSPORTATION SYSTEM

(71) Applicant: American Solar Rail, LLC, Marietta, GA (US)

(72) Inventor: Robert Escoe Green, Macon, GA (US)

(73) Assignee: American Solar Rail, LLC, Marietta, GA (US)

( * ) Notice: Subject to any disclaimer, the term of this patent is extended or adjusted under 35 U.S.C. 154(b) by 0 days.

(21) Appl. No.: 17/704,837

(22) Filed: Mar. 25, 2022

(65) Prior Publication Data

US 2022/0281495 A1    Sep. 8, 2022

Related U.S. Application Data

(63) Continuation of application No. PCT/US2022/018659, filed on Mar. 3, 2022.

(60) Provisional application No. 63/191,027, filed on May 20, 2021, provisional application No. 63/157,128, filed on Mar. 5, 2021.

(51) Int. Cl.
  *B61K 1/00* (2006.01)
  *E01B 7/00* (2006.01)
  *B61B 1/00* (2006.01)

(52) U.S. Cl.
  CPC ........... *B61K 1/00* (2013.01); *B61B 1/00* (2013.01); *E01B 7/00* (2013.01)

(58) Field of Classification Search
  CPC .... B61K 1/00; B61K 1/02; B61B 1/00; E01B 7/00
  See application file for complete search history.

(56) References Cited

U.S. PATENT DOCUMENTS

| | | | | |
|---|---|---|---|---|
| 828,340 A | * | 8/1906 | Rice | B61B 13/00 104/20 |
| 2003/0167960 A1 | * | 9/2003 | Rosenblatt | B61K 1/00 104/27 |

(Continued)

FOREIGN PATENT DOCUMENTS

| | | | | |
|---|---|---|---|---|
| GB | 2531624 A | * | 4/2016 | B61L 5/10 |
| WO | WO-2018071991 A1 | | 4/2018 | |

OTHER PUBLICATIONS

International Search Report and Written Opinion for International Application No. PCT/US2022/018659, dated Jul. 12, 2022, 18 pages.

(Continued)

*Primary Examiner* — Mark T Le
(74) *Attorney, Agent, or Firm* — Cooley LLP

(57) ABSTRACT

A rail system includes a main track, a spur track connected to the main track by a switch changeable between a closed state and an open state, and a station spaced from the main track and accessible by the spur track. The rail system further includes a train with a passenger car and an EMDI releasably coupleable behind the passenger car. A method of operating the rail system includes decoupling the EMDI from the passenger car when the train is moving at a first speed toward the switch in the closed state. The EMDI is decelerated to a second speed less than the first speed. After the train has moved past the switch and the switch has been changed to the open state, the EMDI is diverted from the main track to the spur track via the switch in the open state and decelerated to a stop at the station.

20 Claims, 13 Drawing Sheets

400

(56) References Cited

U.S. PATENT DOCUMENTS

| | | | |
|---|---|---|---|
| 2003/0192450 A1* | 10/2003 | Wood | B61B 1/00 105/1.4 |
| 2011/0098908 A1 | 4/2011 | Chun | |
| 2018/0079436 A1 | 3/2018 | Fifield | |
| 2019/0054929 A1 | 2/2019 | Yao et al. | |
| 2020/0055526 A1* | 2/2020 | Malik | B61B 1/005 |
| 2020/0055530 A1 | 2/2020 | Malik | |
| 2021/0370994 A1 | 12/2021 | Soule et al. | |

OTHER PUBLICATIONS

Brunello, Lara R., et al., Continuous Railway Systems: an Innovative Approach to Improve High Speed Rail Sustainability. In Proceedings 10th International Conference on Applications of Advanced Technologies in Transportation (2008); Athens, Greece, 14 pages.

Liu, Zhigang, et al., "Advances of research on high-speed railway catenary". Journal of Modern Transportation (Mar. 2018); 26(1): 1-23.

Molyneux, John, "Railway Travel Time Analysis". Jan. 20, 1999, pp. 1-3.

Moore, Caleesha, "Georgia may finally get high-speed rail system via infrastructure bill". WMAZ-TV, virtual and VHF digital channel 13, CBS/CW+-affiliated television station licensed to Macon, Georgia, USA, Nov. 8, 2021, Retrieved from The Internet: https://www.13wmaz.com/article/news/local/infrastructure-bill-could-make-way-for-high-speed-railsystem-to-come-to-macon-2/93-3d679cd4-0dd5-473b-99a1-d3b587517388, 2 pages.

Nikkei Asia, "Toyota's game-changing solid-state battery en route for 2021 debut". Nikkei, Dec. 10, 2020, Retrieved from the internet: https://asia.nikkei.com/Spotlight/Most-read-in-2020/Toyota-s-game-changing-solid-statebattery-en-route-for-2021-debut, 3 pages.

Nold and Corman, "Dynamic train unit coupling and decoupling at cruising speed: Systematic classification, operational potentials, and research agenda". Journal of Rail Transport Planning & Management (Jun. 1, 2021); 18: 100241, 26 pages. Available online Mar. 7, 2021.

Ossoff, Jon, United States Senator, Letter to The Honorable Charles Schumer and The Honorable Maria Cantwell, dated Sep. 24, 2021, United States Senate, Washington, DC 20510, USA, 2 pages.

Plas, Patrick, "Expediting a Renewable Energy Future With High-Voltage DC Transmission GE's Patrick Plas makes the case for advancing HVDC systems to support wind and solar." Greenwich Media, Jul. 6, 2017, Retrieved from the Internet on Mar. 24, 2022, https://www.greentechmedia.com/articles/read/expediting-a-renewable-energy-future-with-high-voltage-dc-transmission#comment-3403654921, 5 pages.

Republic Locomotive, "AC Traction vs DC Traction—Greenville, South Carolina—Republic Locomotive". Republic Locomotive (2016); Retrieved from the Internet on Mar. 24, 2022, https://www.republiclocomotive.com/ac-traction-vs-dc-traction.html, 4 pages.

Stock, Byle, "Biden's Charging Plan Could Sell 25 Million Evs". Bloomberg News, Dec. 2, 2020, https://www.bloomberg.com/news/articles/2020-12-02/joe-biden-plan-to-fight-climate-changecould-sell-25-million-electric-cars, 3 pages.

T&D World, "GE Announces First U.S. HVDC Line with Department of Energy". T&D World, Nov. 11, 2016, Retrieved from the Internet on Mar. 24, 2022, GE Announces First U.S. HVDC Line with Department of Energy, 7 pages.

US Department of Transportation, "Remote Coupling and Uncoupling of Freight Cars". Federal Railroad Administration, Research Results RR 08-29, Dec. 2008, 4 pages.

Wesoff, Eric, "Morning Brief: High-voltage power lines are ugly, and the US needs more". pv Magazine USA, Retrieved from the Internet on Mar. 24, 2022, https://pv-magazine-usa.com/2020/12/02/morning-brief-high-voltage-power-lines-are-ugly-and-the-us-needs-more/, 5 pages.

* cited by examiner

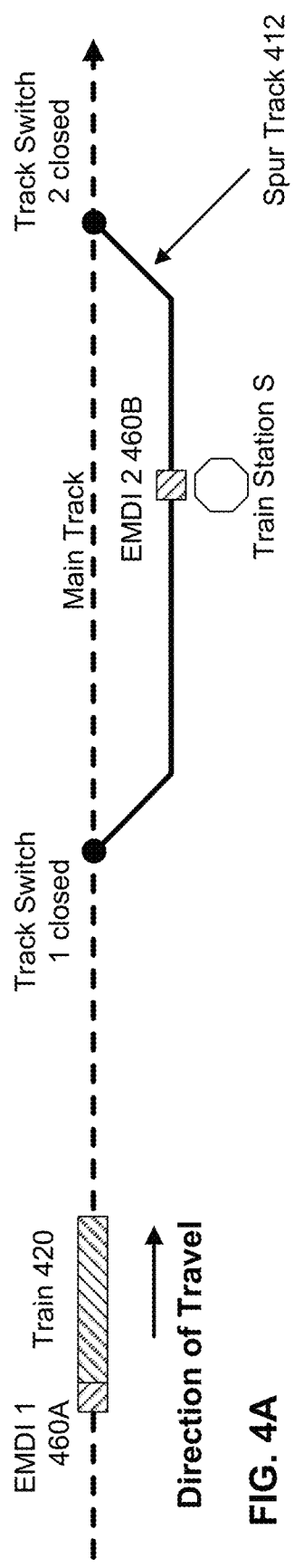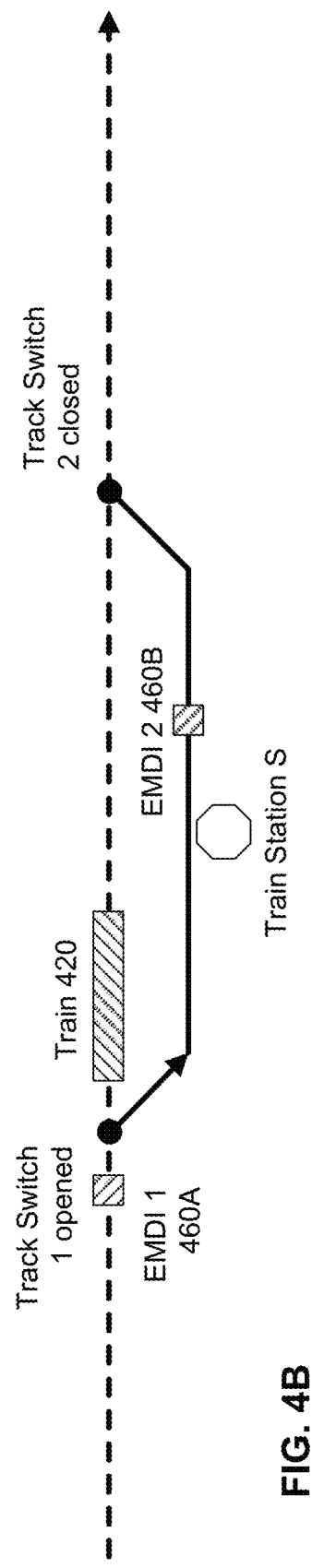
FIG. 4A
FIG. 4B

RAIL TRANSPORTATION SYSTEM

CROSS REFERENCE TO RELATED APPLICATIONS

This application is a continuation of International Patent Application Serial No. PCT/US2022/018659, filed Mar. 3, 2022, entitled "Rail Transportation System," which claims priority to and the benefit of U.S. Provisional Application Ser. No. 63/157,128, filed Mar. 5, 2021, entitled "Rail Transportation System," and of U.S. Provisional Application Ser. No. 63/191,027, filed May 20, 2021, entitled "Rail Transportation System," the entire disclosure of each of which is incorporated herein by reference.

BACKGROUND

Embodiments described herein relate to rail transportation systems in which trains are powered at least in part by external sources of electrical energy.

Responding to threats posed by climate change remains a focus of much attention and reducing contributors to climate change and/or mitigating the impact of such contributors is a global imperative. A significant contributor to climate change is the amount of greenhouse gases (GHGs) accumulating in the atmosphere. For example, combustion of fossil fuels to meet the need for energy generation and/or transportation—both personal and freight—is the largest producer of GHGs. Efforts have been made to reduce the production of GHGs such as producing energy through the use of renewable energy sources (e.g., solar power, wind power, geothermal power, etc.) and/or providing alternatives to combustion-engine-powered transportation modes. These efforts, however, continue to face challenges that slow or hinder adoption. One such challenge, at least in the United States, is a need to upgrade and/or change the infrastructure supporting energy production and transportation.

Accordingly, a need exists for transportation systems (e.g., rail systems) in which vehicles are powered at least in part by external sources of electrical energy such as renewable energy sources including solar energy sources and/or the like.

SUMMARY

Disclosed rail systems includes those in which a rail line is at least partially co-located with an electrical transmission line, from which it draws some or all of the energy used to power the train(s) on the rail line, and in which passengers at intermediate stations along the rail line may be embarked and disembarked from the train while the train is in motion, allowing the train to maintain an average speed that is closer to the maximum speed of the train than would be possible if the train stopped at each station. Such passenger transfers are enabled by a separate transfer car (e.g., an "embarkation/disembarkation vehicle" (EMDI vehicle)) that is releasably coupleable to the remainder of the train (locomotive and other freight or passenger-carrying cars) while the train is in motion. The EMDI vehicle can travel between the train and a station along the rail line by spur tracks connecting the station to the main rail line.

Electrical power carried by the transmission line may be provided by renewable sources of energy, such as solar, wind, geothermal, etc. and/or from stored energy (which may have been produced by such sources).

In some embodiments, a rail system includes a main track, a spur track connected to the main track by a switch changeable between a closed state in which a vehicle travels across the switch on the main track without access to the spur track, and an open state in which a vehicle can be diverted from the main track onto the spur track, and a station spaced from the main track and accessible by the spur track. The rail system further includes a train with a locomotive and a passenger car coupled, directly or indirectly, behind the locomotive, and an EMDI vehicle releasably coupleable, directly or indirectly, behind the passenger car. The rail system is in a first state when the switch is in the closed state such that the train moves along the main track at a first speed in a direction of travel toward the switch and the station with the EMDI vehicle being coupled to the passenger car and a passenger being carried by the EMDI vehicle. A method of operating the rail system includes decoupling the EMDI vehicle from the passenger car. The EMDI vehicle is decelerated to a second speed less than the first speed to create a separation between the EMDI vehicle and the passenger car. After the train has moved past the switch but before the EMDI vehicle has reached the switch and after the switch has been changed from the closed state to the open state, the EMDI vehicle is diverted from the main track to the spur track via the switch. The EMDI vehicle is then decelerated to a stop at the station.

BRIEF DESCRIPTION OF THE DRAWINGS

FIGS. 4A to 4E illustrate a sequence of operation of the rail system of FIG. 1A, according to an embodiment.

DETAILED DESCRIPTION

Figure 1A:
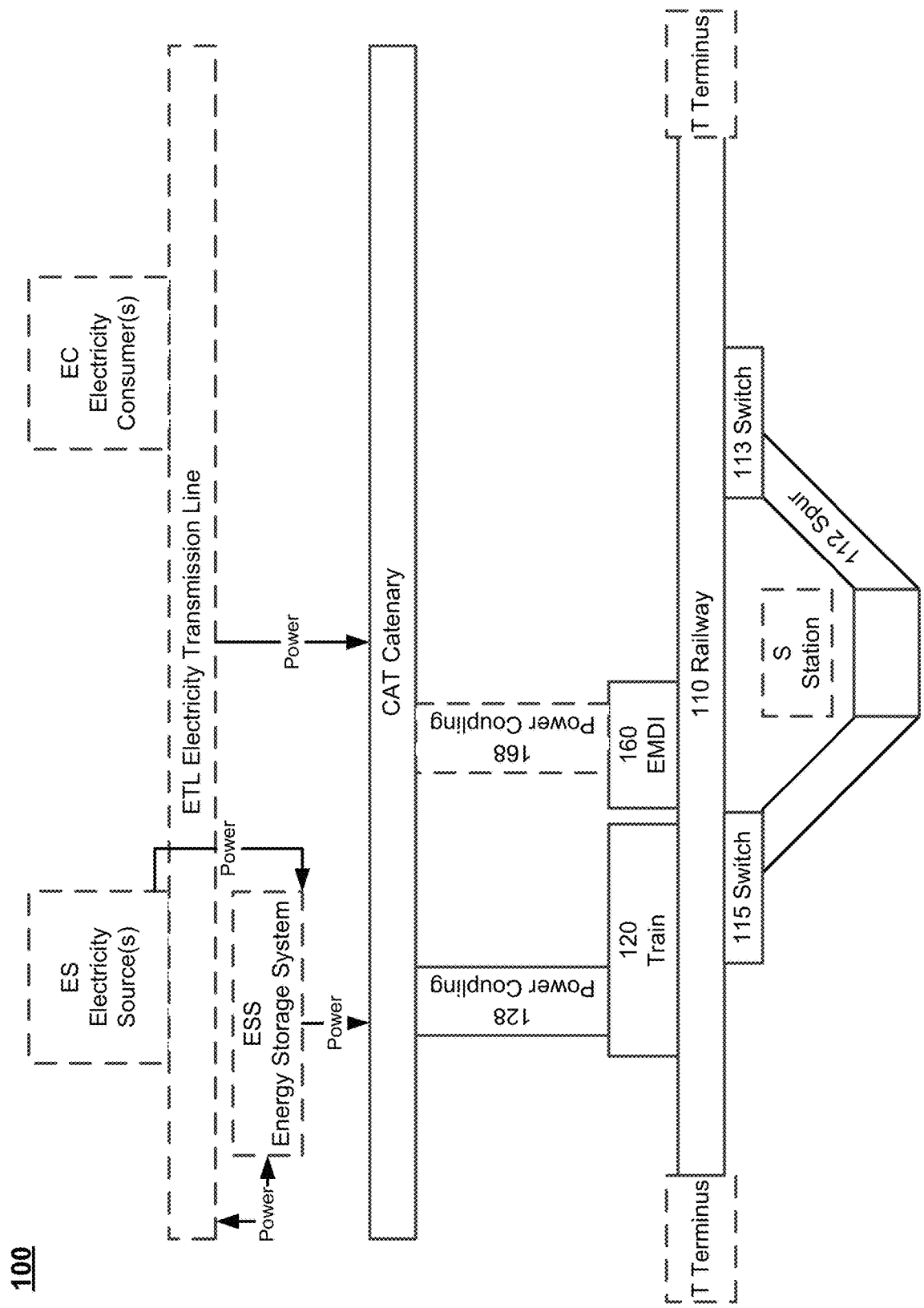
FIG. 1A is a schematic illustration of a rail system according to an embodiment.

Embodiments and implementations described herein relate to rail systems that can include a rail line that is at least partially co-located with an electrical transmission line from which a vehicle traveling along the rail line can draw some or all of the energy used to power the vehicle, and in which passengers at intermediate stations along the rail line may be embarked and disembarked from the vehicle (e.g., train) while the vehicle is in motion, allowing an average speed of the vehicle to be maintained closer to a maximum speed of the vehicle (e.g., at or near a maximum-rated speed associated with the rail line) than would be possible if the train stopped at each station.

In some embodiments, a rail system includes a main track, a spur track connected to the main track by a switch changeable between a closed state in which a vehicle travels across the switch on the main track without access to the spur track, and an open state in which a vehicle can be diverted from the main track onto the spur track, and a station spaced from the main track and accessible by the spur track. The rail system further includes a train with a locomotive and a passenger car coupled, directly or indirectly, behind the locomotive, and an EMDI vehicle releasably coupleable, directly or indirectly, behind the passenger car. The rail system in a first state with the switch in the closed state being such that the train moves along the main track at a first speed in a direction of travel toward the switch and the station with the EMDI vehicle (or simply "EMDI") being coupled to the passenger car and a passenger being carried by the EMDI. In some implementations, a method of operating the rail system includes decoupling the EMDI from the passenger car. The EMDI is decelerated to a second speed less than the first speed to create a separation between the EMDI and the passenger car. After the train has moved past the switch but before the EMDI has reached the switch and after the switch has been changed from the closed state to the open state, the EMDI is diverted from the main track to the spur track via the switch. The EMDI is then decelerated to a stop at the station.

In some embodiments, a rail system includes a main track, a spur track, and a station spaced from the main track and accessible by the spur track. The spur is connected to the main track by a first switch and a second switch disposed on opposite sides of the station. The first switch is changeable between a closed state in which a vehicle traveling on the spur track cannot access the main track and an open state in which a vehicle traveling on the spur track can access the main track. The rail system further includes a train with a locomotive and at least one passenger car coupled, directly or indirectly, behind the locomotive, and an EMDI releasably coupleable, directly or indirectly, behind the passenger car. The rail system in a first state with the first switch in the closed state being such that the train moves along the main track at a first speed in a direction of travel in which the first switch is past the station and with the EMDI being disposed on the spur track adjacent to the station and a passenger being located in the station. In some implementations, a method of operating the rail system includes embarking the passenger from the station onto the EMDI. The EMDI is accelerated on the spur track toward the first switch. After the train has moved past the first switch and after the first switch has been changed from the closed state to the open state, the EMDI exits from the spur track onto the main track behind the train via the switch. The EMDI is accelerated to a second speed, higher than the first speed and a distance between the EMDI and the train is reduced until the EMDI reaches the passenger car. The EMDI is then coupled to the passenger car.

In some embodiments, a rail system includes a main track, a spur track connected to the main track at two separated locations by a first switch and a second switch, and a station being (i) spaced from the main track, (ii) accessible by the spur track, and (iii) disposed between the first switch and the second switch. The first switch being changeable between a closed state in which a vehicle traveling on the main track will stay on the main track across the switch, and cannot access the spur track, and an open state in which a vehicle traveling on the main track can be diverted from the main track onto the spur track. The second switch being changeable between a closed state in which a vehicle traveling on the spur track cannot access the main track and an open state in which a vehicle traveling on the spur track can access the main track. The rail system further includes a train with a locomotive and a passenger car coupled, directly or indirectly, behind the locomotive, a first EMDI being releasably coupleable, directly or indirectly, behind the passenger car, and a second EMDI being releasably coupleable, directly or indirectly, behind the passenger car. The rail system in a first state with each of the first switch and the second switch in the closed state being such that the train moves along the main track at a first speed in a direction of travel in which the second switch is past the first switch and with the first EMDI being coupled to the passenger car, a first passenger being carried by the first EMDI, and a second passenger being located in the station. In some implementations, a method of operating the rail system includes decoupling the first EMDI from the passenger car before the train reaches the first switch. After the first EMDI has decelerated to a speed less than the first speed with a separation between the first EMDI and the passenger car such that the train has passed the first switch and the first EMDI has been diverted from the main track onto the spur track via the first switch in the open state, the train is decelerated from the first speed to a second speed, lower than the first speed. After (i) the train has moved past the second switch, (ii) the second switch has changed from its closed state to its open state, (iii) the second EMDI has embarked the second passenger from the station, left the station on the spur track, and entered the main track from the spur track via the second switch, accelerated to a third speed, higher than the second speed, and reduced a distance between the second EMDI and the train until the second EMDI reaches the passenger car, the second EMDI is coupled to the passenger car. The train is then accelerated from the second speed to the first speed.

In some embodiments, a rail system includes a main track, a spur track connected to the main track at two separated locations by a first switch and a second switch, and a station being (i) spaced from the main track, (ii) accessible by the spur track, and (iii) disposed between the first switch and the second switch. The first switch being changeable between a closed state in which a vehicle traveling on the main track will stay on the main track across the switch, and cannot access the spur track, and an open state in which a vehicle traveling on the main track can be diverted from the main track onto the spur track. The second switch being changeable between a closed state in which a vehicle traveling on the spur track cannot access the main track and an open state in which a vehicle traveling on the spur track can access the main track. The rail system further includes a train with a locomotive and a passenger car coupled, directly or indirectly, behind the locomotive, a first EMDI being releasably coupleable, directly or indirectly, behind the passenger car, and a second EMDI being releasably coupleable, directly or indirectly, behind the passenger car. The rail system in a first state with each of the first switch and the second switch in the closed state being such that the train moves along the main track at a first speed in a direction of travel in which the second switch is past the first switch and with the first EMDI being coupled to the passenger car, a first passenger being carried by the first EMDI, and a second passenger being located in the station. In some implementations, after the first EMDI has been decoupled from the passenger car and decelerated to a speed less than the first speed, creating a separation between the first EMDI and the passenger car, and after the train has passed the first switch but the first EMDI has not reached the first switch, a method of operating the rail system includes causing the first switch to change from its closed state to its open state, thereby enabling the first EMDI to be diverted from the main track onto the spur track via the first switch. The method can further include, after the train has moved past the second switch but before the second EMDI, which has embarked the second passenger from the station and left the station on the spur track moving towards the second switch, has reached the second switch, causing the second switch to move from its closed position to its open position, thereby enabling the second EMDI to enter the main track from the spur track via the second switch, behind the train.

In some embodiments, a rail system includes a main track, a spur track, and a catenary system. The spur track is connected to the main track at two separated locations by a first switch and a second switch. The spur track provides access to a station spaced from the main track and disposed between the first switch and the second switch. The catenary system includes a first portion and a second portion. The first portion is disposed in operative relation to the main track to provide electrical power to a locomotive of a train that includes a passenger car and to an EMDI releasably coupleable, directly or indirectly, behind the passenger car. The second portion is disposed in operative relation to the spur track to provide electrical power to the EMDI when the EMDI is operating on the spur track.

The terminology used herein is for the purpose of describing particular embodiments only and is not intended to limit the full scope of the claims. Unless defined otherwise, all technical and scientific terms used herein have the same meanings as commonly understood by one of ordinary skill in the art.

As used in this specification, the singular forms "a," "an," and "the" include plural referents unless the context clearly dictates otherwise. For example, the term "a member" is intended to mean a single member or a combination of members, "a material" is intended to mean one or more materials, or a combination thereof. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims, are generally intended as "open" terms (e.g., the term "including" should be interpreted as "including but not limited to," the term "having" should be interpreted as "having at least," etc.). For example, the terms "comprise(s)" and/or "comprising," when used in this specification, are intended to mean "including, but not limited to." While such open terms indicate the presence of stated features, integers (or fractions thereof), steps, operations, elements, and/or components, they do not preclude the presence or addition of one or more other features, integers (or fractions thereof), steps, operations, elements, components, and/or groups thereof, unless expressly stated otherwise.

As used herein the term "and/or" includes any and all combinations of one or more of the associated listed items. Said another way, the phrase "and/or" should be understood to mean "either or both" of the elements so conjoined (i.e., elements that are conjunctively present in some cases and disjunctively present in other cases). It should be understood that any suitable disjunctive word and/or phrase presenting two or more alternative terms, whether in the description, claims, or drawings, contemplate the possibilities of including one of the terms, either of the terms, or both terms. Other elements may optionally be present other than the elements specifically identified by the "and/or" clause, whether related or unrelated to those elements specifically identified. Thus, as a non-limiting example, a reference to "A and/or B" can refer to "A" only (optionally including elements other than "B"), to "B" only (optionally including elements other than "A"), to both "A" and "B" (optionally including other elements), etc.

As used herein, "or" should be understood to have the same meaning as "and/or" as defined above. For example, when separating items in a list, "or" or "and/or" shall be interpreted as being inclusive (e.g., the inclusion of at least one, but also including more than one, of a number or list of elements, and, optionally, additional unlisted items). Only terms clearly indicated to the contrary, such as when modified by "only one of" or "exactly one of" (e.g., only one of "A" or "B," "A" or "B" but not both, and/or the like) will refer to the inclusion of exactly one element of a number or list of elements.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements, unless expressly stated otherwise. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B" or "at least one of A and/or B") can refer to one or more "A" without "B," one or more "B" without "A," one or more "A" and one or more "B," etc.

All ranges disclosed herein are intended to encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member and/or a fraction of an individual member where appropriate.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 100 can include 90 to 110. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

As used herein, the term "set" can refer to multiple features, components, members, etc. or a singular feature, component, member, etc. with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

Figure 1B:
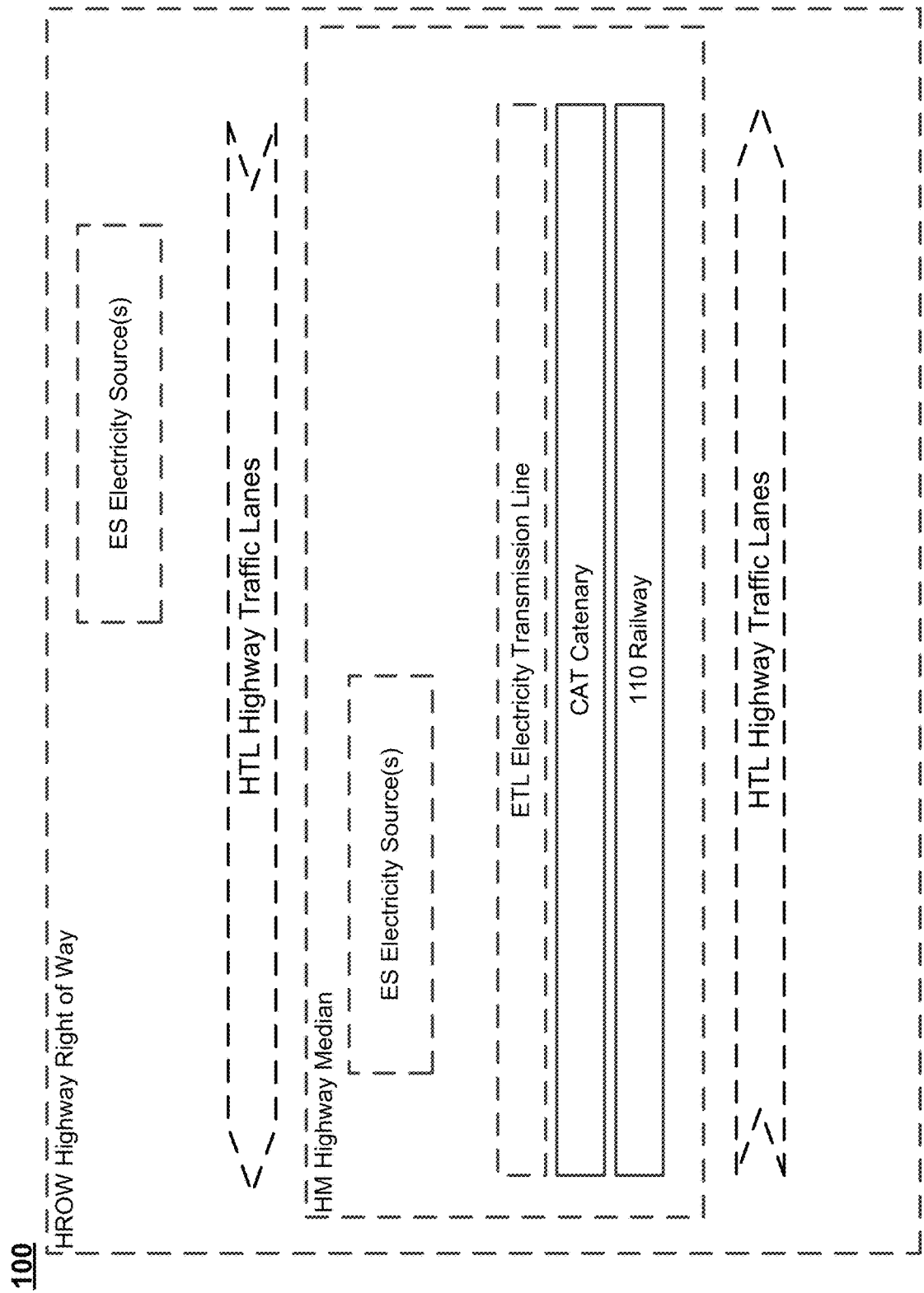
FIG. 1B is a schematic illustration of a rail system of FIG. 1A, showing an exemplary arrangement of the rail system in a highway right of way.

Referring now to the drawings, FIGS. 1A and 1B are schematic illustrations of a rail system 100 according to an embodiment. As shown, the rail system 100 includes a railway 110, a train 120, transfer car or embarkation/disembarkation vehicle (referred to herein as "EMDI vehicle" or simply "EDMI") 160, and a catenary CAT. Rail system 100 can serve to transport freight and/or passengers between two terminuses T at respective ends of railway 110, and one or more intermediate stations S located between terminuses T and selectively connected to railway 110 by rail spur track 112 and respective switches 113, 115.

Catenary CAT can supply electrical energy to train 120 via power coupling 128, and optionally to EMDI 160 by power coupling 168. Power couplings 128, 168 may each be implemented as a pantograph. Catenaries and pantographs are well known mechanisms for providing electrical energy to trains—suitable examples and considerations for high-speed railways are described in detail in Liu, Z., Song, Y., Han, Y. et al. Advances of research on high-speed railway catenary. *J. Mod. Transport.* 26, 1-23 (2018), the disclosure of which is incorporated herein by reference.

Catenary CAT can receive electrical energy from an electricity transmission line ETL, which in turn receives electrical energy from one or more electricity sources ES that are electrically coupled to the ETL. Electricity sources ES can be any one or more known sources of electrical energy, but are advantageously renewable sources. For example, electricity sources ES can be solar (photovoltaic) panels, wind turbines, hydroelectric (water turbines), geothermal generators, etc. Advantageously, such renewable electricity sources may be located near to the transmission line, and the transmission line is located near, or even colinear with, catenary CAT and railway 110. For example, as shown schematically in FIG. 1B, railway 110 may be constructed along a right of way for a highway HROW (e.g. in the highway median HM separating opposite highway traffic lanes HTL) and, in conventional fashion, catenary CAT is constructed over railway 110. Electricity transmission line ETL can also be constructed in the highway median HM, or adjacent to but outside of the highway traffic lanes HTL, but still in the highway right of way HROW, with a relatively short distance electrical coupling to catenary CAT. Electricity sources ES (such as solar panel arrays) can be located in the highway median HM and/or outside of the highway traffic lanes HTL but in the highway right of way HROW. Electricity sources ES can also be any other sources on the electrical grid to which electricity transmission line ETL may be coupled.

Rail system 100 may also include one or more energy storage systems ESS. An energy storage system ESS may be any system that can receive electrical energy, e.g. from the electricity transmission line ETL and/or directly from one or more electricity sources ES, optionally convert the energy from electric to another form (chemical, kinetic, potential, etc.) and back to electric, and supply the electrical energy to the catenary CAT, and optionally to electricity transmission line ETL. The stored energy can be used to supply energy required to operate rail system 100, and particularly train 120 and EMDI 160, during interruptions to the supply of electrical transmission line ETL, such as failures of the ETL or connected grid power sources, or reduced energy from energy source(s) ES (for example if energy source is a solar array, it would not supply electrical energy at night). Energy storage system ESS may be implemented with any suitable technology for storing large amounts of energy, such as the technologies used for electrical grid storage. For example, it may be implemented as a battery, such as using lithium ion technology. It may also be implemented as a flywheel coupled to a motor/generator, thus converting electrical energy to kinetic energy for storage and then converting the kinetic energy back to electrical energy when needed. It may also be implemented as a system to convert electrical energy to and from mechanical potential energy, such as motor/generator coupled to a solid mass that can be lifted to store energy and lowered to release energy, or coupled to a water turbine to pump water or other liquid between upper and lower reservoirs. It may also be implemented with a reversible compressor and motor/generator to compress and store, and then retrieve and decompress, gas in a reservoir. It may also be implemented using other chemical intermediaries, such as hydrogen, e.g. by electrolysis of water to produce hydrogen, storage of the hydrogen, and the conversion of the hydrogen back to electricity, such as by a fuel cell.

Advantageously, electricity transmission line ETL may also supply electrical energy to one or more electricity consumers EC, which may be industrial, commercial, and/or residential consumers, or other transportation modalities, e.g. electrically powered cars or aircraft. For example, a "vertiport" or operating station for advanced aerial mobility aircraft (air taxis, electric or hybrid electric vertical or short takeoff and landing vehicles, eVTOL/eSTOL) may be co-located at any or all of the terminuses and stations of the rail system, and/or elsewhere along or near the ETL. Charging stations for electric vehicles (cars, buses, trucks) may be similarly co-located. Thus, rail system 100 can function not only as a high-speed transportation system for freight and passengers, but also as a distribution system for renewable energy— "light freight." In some implementations, an energy source ES and one or more electricity consumers EC can be co-located or substantially co-located. For example, an electricity consumer EC can be an industrial, commercial, and/or residential consumer owning and/or otherwise controlling property, land, water rights, etc. on which an energy source ES can be operated (e.g., a solar power (photovoltaic) panel, installation, farm, and/or the like). As such, an electricity transmission line ETL may electrically connect the energy source ES to the electricity consumer EC, and then electrically connect the energy source ES to the catenary CAT. While a specific example is provided, it will be understood that the arrangement of the energy source ES, electricity consumer EC, and catenary CAT can be modified for specific implementations which can include any suitable electrical connections run in parallel or series.

Rail system 100 can include components that operate using alternating current (AC) and/or direct current (DC), and may employ known technologies and devices for converting between AC and DC as needed. For example, one possible energy source ES is solar (photovoltaic) panels, which output electrical energy in DC form. In contrast, wind turbines typically output electrical energy in AC form. High voltage, long-distance electrical transmission lines conventionally carry electrical energy in AC form. However, high-voltage direct current (HVDC) transmission systems can allow higher power to be transferred over longer distances than AC, albeit at higher initial construction cost than AC. For some electricity consumers EC, DC may be the preferable form of electrical energy. For example, DC may enable faster charging of the batteries of electric vehicles EV (such as automobiles or aircraft). Traction motors for train locomotives are conventionally driven by AC.

As described above, an energy source ES and an electricity consumer EC can be collocated or substantially co-located. In implementations in which the energy source ES is solar panels, production and consumption of electrical energy can be DC electrical energy, which advantageously simplifies implementation, reduces energy losses, and/or the like. In some embodiments, a DC electricity transmission line ETL from the energy source ES or the electricity consumer EC can be electrically terminated at, for example, an inverter or converter configured to output AC electrical energy suitable for delivery to the catenary CAT and/or other portions of the AC electricity transmission lines ETL included therein. In some implementations, such a configuration can allow for electrical isolation and/or decoupling of a single energy source ES (or a single group of energy sources ES) at a specific terminus, station, and/or location along the main track providing electrical protection to remaining portions of the catenary CAT resulting from electrical shorts, overloads, component failure and/or the like.

As described in more detail below with reference to FIG. 2A, train 120 can operate on railway 110, traveling between terminuses T, and may be powered in whole or in part by electrical energy received from catenary CAT via power coupling 128. One or more EMDI vehicles 160 can be selectively coupled to train 120. While coupled to train 120, EMDI 160 travels on railway 110. However, when decoupled from train 120, EMDI 160 can travel on rail spur track 112 between railway 110 and station S. As described in more detail below with reference to FIGS. 3 and 4A-4E, EMDI 160 may decouple from train 120 and, with switch 113 disposed in an "open" position, exit railway 110 and enter spur track 112, on which it can then travel to station S and discharge passengers. The EMDI 160 can embark passengers at station S, travel along spur track 112, and with switch 115 in an "open" position, exit spur track 112 and enter railway 110, where it can couple to another train 120. Although, for ease of illustration, FIG. 1A shows a single station S and associated rail spur tracks and switches, it is contemplated that rail system 100 can include multiple stations and associated rail spur tracks and switches, so that rail system 100 can provide passenger transportation to and from multiple locations along railway 110 and to and from terminuses T. Similar, multiple trains 120 may operate on railway 110, as well as multiple EMDI vehicles 160. Similarly, although shown in FIG. 1A as a unidirectional railway 110, with train 120 and EMDI 160 traveling from right to left in FIG. 1A, it is contemplated that rail system 100 can include a bidirectional railway, with two or more sets of tracks enabling multiple trains to operating concurrently in opposite directions between terminuses T, with each set of tracks having access to stations S through associated switches and rail spur tracks. This rail architecture enables train 120 to move continuously along railway 110 between terminuses T, not stopping at intermediate station(s) S, while still transporting passengers to/from intermediate station(s) S and terminuses T by way of EMDI(s) 160. Train 120 may operate continuously at a high speed, or may reduce speed over a portion of the railway 110 near station S to facilitate rendezvous and coupling with EMDI(s) 160. As explained in more detail below, this enables train 120 to operate at an average speed that is a much higher percentage of its maximum operating speed than if the train were to stop at station(s) S. Thus, train 120 can provide shorter travel times between terminuses T (and to/from station(s) S) than conventional low-speed rail systems, and with less expensive railway and train equipment than known high-speed rail systems.

Figure 2A:
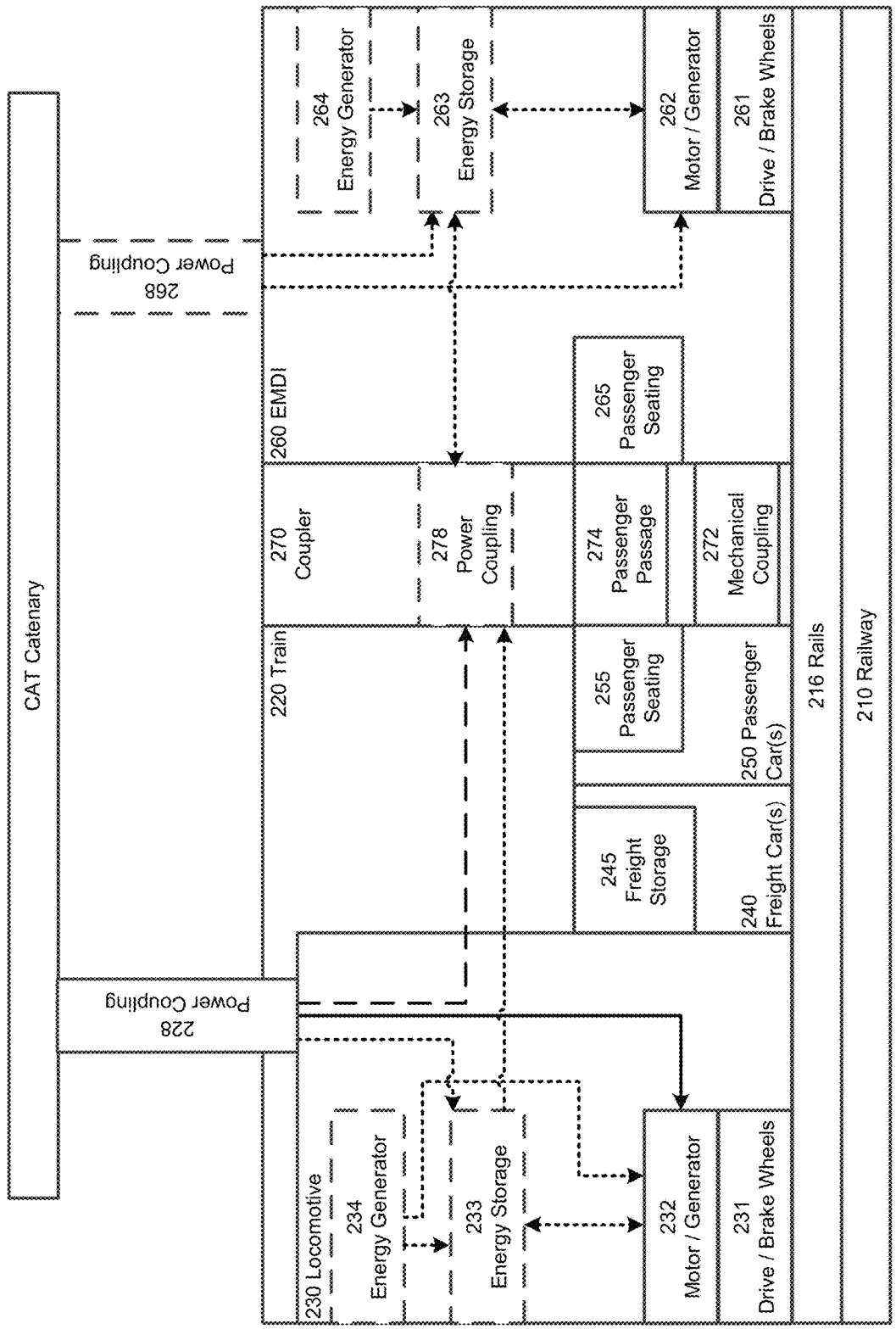
FIG. 2A is a schematic illustration of a train and an embarkation/disembarkation vehicle (EMDI vehicle) of a rail system, according to an embodiment.
Figure 2B:
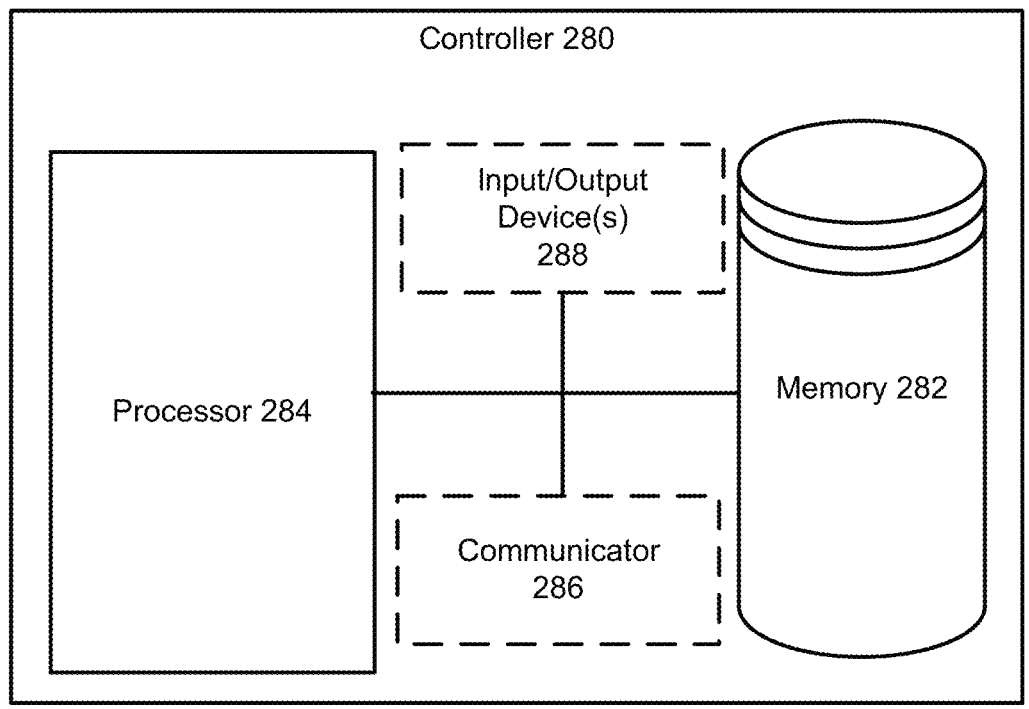
FIG. 2B is a schematic illustration of controller included in the rail system shown in FIG. 2A.

FIGS. 2A and 2B illustrate portions of a rail system 200, which may be similar to rail system 100, and a more detailed illustration of an exemplary train 220 and EMDI vehicle 260, according to an embodiment. As shown in FIG. 2A, rail system 200 includes a catenary CAT, which can receive electrical energy from sources and by arrangements such as those described above for rail system 100. Railway 210 includes rails 216 on which train 220 and EMDI 260 can travel. Train 220 can include one or more locomotives 230, one or more freight cars 240, and one or more passenger cars 250, all of which may be selectively coupled together for travel on rails 216, drawn by locomotive(s) 230, and decoupled, e.g. at a terminus T, in conventional fashion.

Locomotive 230 can be coupled to catenary CAT by power coupling 228, from which it can receive electrical energy for its operation. Locomotive 230 includes traction (or "drive/brake") wheels 231, which engage with rails 216 to provide motive force to locomotive 230 to accelerate locomotive 230 to desired speed(s) and maintain locomotive 230 at the desired speed (and thus train 220 and, when coupled to train 220, EMDI 260). Drive/brake wheels 231 are powered by motor/generator 232, which can convert electrical energy to mechanical energy to rotate drive/brake wheels 231. The electrical energy provided to motor/generator 232 can be received directly from power coupling 228 (and thus from catenary CAT). Motor/generator 232 can also, or instead, receive electrical energy from an energy storage 233 and/or an energy generator 234. For example, energy generator 234 can be a diesel locomotive generator system, which converts chemical energy in diesel fuel to mechanical energy in an internal combustion engine and then to electrical energy by a generator. Train locomotives using such hybrid diesel/electric energy arrangements are known, for example the Vectron Dual Mode locomotive produced by Siemens or the Bi-mode locomotive produced by Hitachi. Such locomotives can operate by electrical energy from a catenary, from a diesel generator, or a combination of both.

Energy storage 233 can store electric energy on board locomotive 230 and supply it to motor/generator 232 as needed, e.g. when insufficient electric energy is available from catenary CAT via power coupling 228 and/or from energy generator 234. Energy storage can be implemented as a battery, flywheel system, or other chemical system, in known fashion.

Drive/brake wheels 231 can also generate electric energy, such as when decelerating locomotive 230 (and train 220, and EMDI 260 when coupled to train 220), by known regenerative braking techniques. The generated electrical energy can be stored in optional energy storage 233, used for other electrical energy needs of train 220 (or EMDI 260 when coupled to train 220), or directed to catenary CAT (and thence to electrical transmission line ETL) via power coupling 228.

As noted above, train 220 can include one or more freight car(s) 240 to be transported between terminuses T. Each freight car 240 can be implemented as any of conventional, known railway freight car types that may be used to carry freight (autorack, boxcar, centerbeam, covered hopper, coil car, flat car, gondola, intermodal equipment, refrigerated boxcar, open-top hopper, tank car, well car, etc.). As shown schematically in FIG. 2A, each freight car 240 includes freight storage 245 in which freight is carried.

As noted above, train 220 can include one or more passenger car(s) 250 to be transported between terminuses T. Each passenger car 250 can be implemented as any of conventional, known railway passenger car types that may be used to transport passengers (open coach, compartment, dining, lounge, observation, etc.). As shown schematically in FIG. 2A, each passenger car 250 includes passenger seating 255 in which passengers may be carried while the train 220 is traveling. Advantageously, as shown schematically in FIG. 2A, a passenger car 250 is the last car of train 220, so that it can be selectively coupled to and uncoupled from a EMDI 260. However, in some embodiments, a different type of car may be the last car of train 220, passengers may move through that car from EMDI 260 to a passenger car 250.

Although not shown in FIG. 2A, train 220 can also include other types of cars to be transported between terminuses T, such as head end equipment (baggage, stock, prisoner, railway post office, etc.) or other specialized car types (combine, dome, double-decker, etc.) to be transported between terminuses T.

EMDI 260 may be coupled to train 220 (e.g. to a passenger car 250) by a coupler 270. Coupler 270 may be a part of EMDI 260, a part of passenger car 250, or may be collectively formed from portions of both EMDI 260 and passenger car 250. Coupler 270 provides for secure, but releasable, mechanical coupling of EMDI 260 and passenger car 250 (and thus train 220), via mechanical coupling 272. It also provides for transfer of passengers back and forth between EMDI 260 and passenger car 250 via passenger passage 274. Optionally, coupler 270 may also provide for transfer of electrical energy between train 220 and EMDI 260, via power coupling 278, as described in more detail below.

EMDI 260 includes passenger seating 265, in which passengers may be carried at least while the EMDI 260 is traveling between train 220 and a station S (as shown in FIG. 1A). When EMDI 260 is coupled to train 220, e.g. to the last passenger car 250, via coupler 270, passengers can move between passenger car 250 and EMDI 260 via passenger passage 274. Thus, upon arrival of an EMDI 260 carrying passengers from a station S to train 220, and coupling the EMDI 260 to passenger car 250 via coupler 270, passengers can move from EMDI 260 to passenger car 250 and passenger seating 255 (and/or other cars on train 220) for more comfortable travel than may be afforded on EMDI 260. Alternatively, in certain modes of operation of rail system 200, some or all of the passengers in EMDI 260 who boarded at a station S may remain in EMDI 260 until EMDI 260 is decoupled from passenger car 250 (and thus train 220) and travels to another station S, or remains coupled until train 220 reaches a terminus T. Similarly, passengers wishing to leave train 220 for a station S (rather than remaining on train 220 until its arrival at a terminus T) may move from passenger seating 255 (or another passenger car on train 220) through passenger passage 274 and into passenger seating 265 on EMDI 260 in preparation for decoupling of EMDI 260 from train 220 and travel to station S.

EMDI 260 includes drive/brake wheels 261 and motor/generator 262, which may be implemented similarly to drive/brake wheels 231 and motor/generator 232 of locomotive 230. Together, drive/brake wheels 261 and motor/ generator 262 can provide motive force to EMDI 260 to accelerate EMDI 260 from a station S along a spur track to join rails 216 and then to a desired speed to rendezvous and couple with train 220. Similar to the arrangement in locomotive 230, electrical energy to operate motor generator 262 may be supplied by a power coupling 268 to catenary CAT (while EMDI is on rails 216—optionally, a spur track catenary, not shown, may be provided on the spur track). Additionally, or alternatively, and depending in part on different modes or stages of operation of EMDI 260, electrical energy may be supplied by an energy generator 264 and/or energy storage 263 (similar to energy generator 234 and energy storage 233 of locomotive 230).

In some embodiments, electrical energy may be supplied by power coupling 278. In turn, power coupling 278 may receive electrical energy from train 220 from one or more of power coupling 228 (and thus catenary CAT), energy storage 233, energy generator 234, and/or motor/generator 232. In some embodiments, power coupling 278 may be bidirectional, i.e. electrical energy may be supplied from EMDI 260 (from power coupling 268, energy generator 264, energy storage 263, and/or motor generator 262) to train 220 (e.g. to energy storage 233, motor/generator 232, and/or power coupling 228 (and thence to catenary CAT).

The operation of EMDI 260, coupler 270, and switches of the railway may be controlled automatically, such as by one or more compute systems executing software instructions and responding to signals from various sensors. Such compute systems may be included in the EMDI 260, in locomotive 230, and/or in stationary components of the rail system 200, such as at one or more stations and/or a control facility, installation, hub, station, etc. In some implementations, the operation may be monitored or supervised, and/or controlled in whole or in part by one or more human operators in the EMDI, locomotive, and/or one or more stations or other stationary facilities of the rail system. In some implementations, one or more portions or functions of the rail system 200 can be operated and/or controlled at least semi-autonomously. In such implementations, a compute system can execute instructions associated with controlling one or more portions or functions of the rail system 200 and/or can execute one or more machine learning or artificial intelligence models, algorithms, etc. associated with controlling one or more portions or functions of the rail system 200 (e.g., based on past, current, and/or projected operating conditions, etc.).

FIG. 2B illustrates an example of a controller 280 included in the system 200. The controller 280 can be one or more compute devices such as a personal computer (PC), a workstation, a server device (e.g., a web server device), a network management device, an administrator device, and/ or so forth. In some embodiments, the controller 280 can be a group of servers or devices housed together in or on the same blade, rack, and/or facility or distributed in or on multiple blades, racks, and/or facilities. In some implementations, the controller 280 can be a physical machine (e.g., a server or group of servers) that includes and/or provides a virtual machine, virtual private server, and/or the like that is executed and/or run as an instance or guest on the physical machine, server, or group of servers (e.g., the host device). In some implementations, at least a portion of the functions of the rail system 200 and/or controller 280 described herein can be stored, run, executed, and/or otherwise deployed in a virtual machine, virtual private server, and/or cloud-computing environment. Such a virtual machine, virtual private server, and/or cloud-based implementation can be similar in at least form and/or function to a physical machine. Thus, the controller 280 can be one or more physical machine(s) with hardware configured to (i) execute one or more processes associated with the controller 280 or (ii) execute and/or provide a virtual machine that in turn executes the one or more processes associated with the controller 280. Similarly stated, the controller 280 may be a physical machine configured to perform any of the processes, functions, and/or methods described herein whether executed directly by the physical machine or executed by a virtual machine implemented on the physical controller 280.

For example, the controller 280 can include at least a memory 282 and a processor 284. In some implementations, the controller 280 can also include at least a communicator 286 and an input/output device(s) 288. The memory 282, processor 284, communicator 286, and input/output device(s) 288 are in communication, connected, and/or otherwise electrically coupled to each other such as to allow signals to be sent therebetween (e.g., via a system bus, electrical traces, electrical interconnects, and/or the like). The memory 282 of the controller 280 can be a random access memory (RAM), a memory buffer, a hard drive, a read-only memory (ROM), an erasable programmable read-only memory (EPROM), an electrically erasable programmable read-only memory (EEPROM), a flash memory or other suitable solid state non-volatile computer storage medium, and/or the like. In some instances, the memory 282 includes a set of instructions or code (e.g., executed by the processor 284) used to perform one or more actions associated with, among other things, controlling one or more portions and/or components of the rail system 200.

The processor 284 can be any suitable processing device configured to run or execute a set of instructions or code (e.g., stored in the memory 282). For example, the processor can be a general-purpose processor (GPP), a central processing unit (CPU), an accelerated processing unit (APU), a graphics processor unit (GPU), a field programmable gate array (FPGA), an Application Specific Integrated Circuit (ASIC), and/or the like. The processor 284 can run or execute a set of instructions or code stored in the memory 282 associated with communicating with and/or controlling one or more portions or components of the rail system 200. For example, the processor 284 can execute a set of instructions or code stored in the memory 282 associated with controlling (opening or closing) one or more switching, directing traffic along the railway, directing a flow of electrical energy, controlling one or more trains, locomotives, EMDIs, vehicles, etc., and/or the like.

The communicator 286 of the controller 280 can be any suitable module, component, engine, and/or device that can place the controller 280 in communication with one or more portions of the rail system 200 (e.g., via one or more networks). For example, the communicator 286 can be a network interface card or the like including, for example, an Ethernet port, a universal serial bus (USB) port, a WiFi® radio, a Bluetooth® radio, a near field communication (NFC) radio, a cellular radio, and/or the like. Moreover, the communicator 286 can be electrically connected to the memory 282 and the processor 284 (e.g., via a system bus and/or the like). As such, the communicator 286 can send signals to and/or receive signals from the processor 284 associated with electronically communicating with the rail system 200 (e.g., via one or more networks).

The input/output device(s) 288 of the controller 280 can be any suitable module, component, and/or device that can receive, capture, and/or record one or more inputs (e.g., user inputs) and that can send signals to and/or receive signals from the processor 284 associated with the one or more inputs and/or that can provide an output resulting from one or more processes being performed on or by the controller 280. For example, the input/output device(s) 288 can be and/or can include any suitable module, component, and/or device that can receive, capture, and/or record one or more inputs (e.g., user inputs) and that can send signals to and/or receive signals from the processor associated with the one or more inputs. In some implementations, such input/output device(s) can be and/or can include ports (e.g., USB port(s), FireWire port(s), Thunderbolt port(s), Lightning ports, and/or the like), cameras, microphones, peripherals (e.g., keyboard, mouse, and/or the like), etc. In some implementations, a touch screen or the like of a display (e.g., the output device) can be an input device configured to receive a tactile and/or haptic user input. In some implementations, the input/output device(s) 288 can be and/or can include a display such as, for example, a cathode ray tube (CRT) monitor, a liquid crystal display (LCD) monitor, a light emitting diode (LED) monitor, and/or the like that can graphically represent data and/or any suitable portion of the rail system 200. In some implementations, the processor 284 can execute a set of instructions to cause the display (input/output device(s) 288) to graphically represent data, a graphical user interface (GUI) associated with a webpage, PC application, mobile application, and/or the like that can be operable in controlling one or more portions of the rail system 200.

As described above, in some implementations, the controller 280 can be in communication with the rail system 200 (or one or more portions or components thereof) via a network(s). The network can be any type of network or combination of networks such as, for example, a local area network (LAN), a wireless local area network (WLAN), a virtual network (e.g., a virtual local area network (VLAN)), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, digital cellular telephone connection, Cellular Digital Packet Data (CDPD) connection, digital satellite data connection, a virtual private network (VPN), and/or any other suitable network. The network can be implemented as a wired and/or wireless network. By way of example, the network can be implemented as a WLAN based on the Institute of Electrical and Electronics Engineers (IEEE) 802.11 standards (also known as "WiFi 0"). Moreover, the network can include a combination of networks of any type such as, for example, a LAN or WLAN and the Internet. In some implementations, communication (e.g., between the controller 280 and portion(s) of the rail system 200) can be established via the network and any number of intermediate networks and/or alternate networks (not shown), which can be similar to or different from the network. As such, data can be sent to and/or received by devices, databases, systems, etc. using multiple communication modes (e.g., associated with any suitable network(s) such as those described above) that may or may not be transmitted using a common network.

Figure 3:
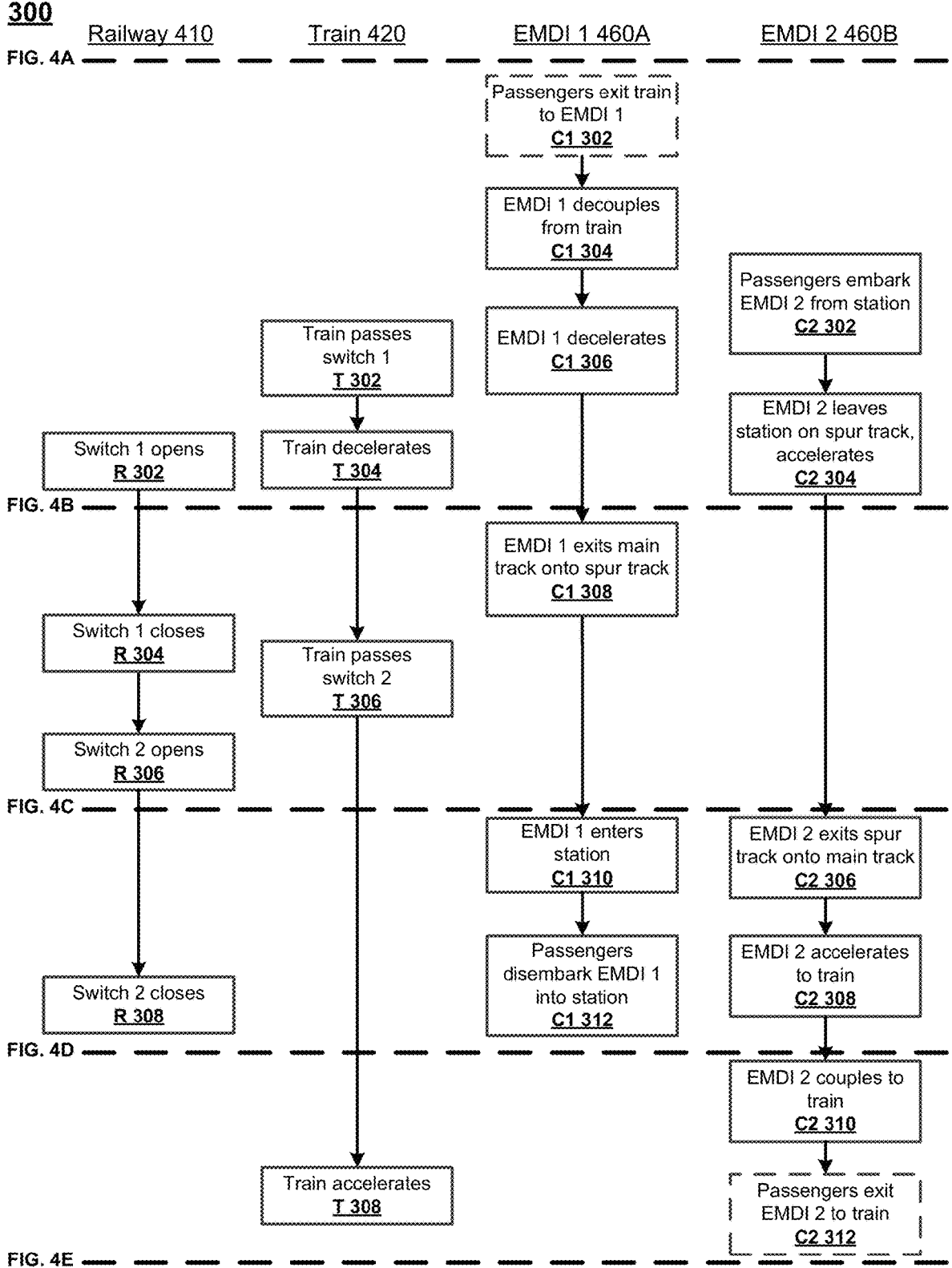
FIG. 3 is a flow diagram illustrating a method of operating the rail system of FIG. 1A, according to an embodiment.
Figure 4C:
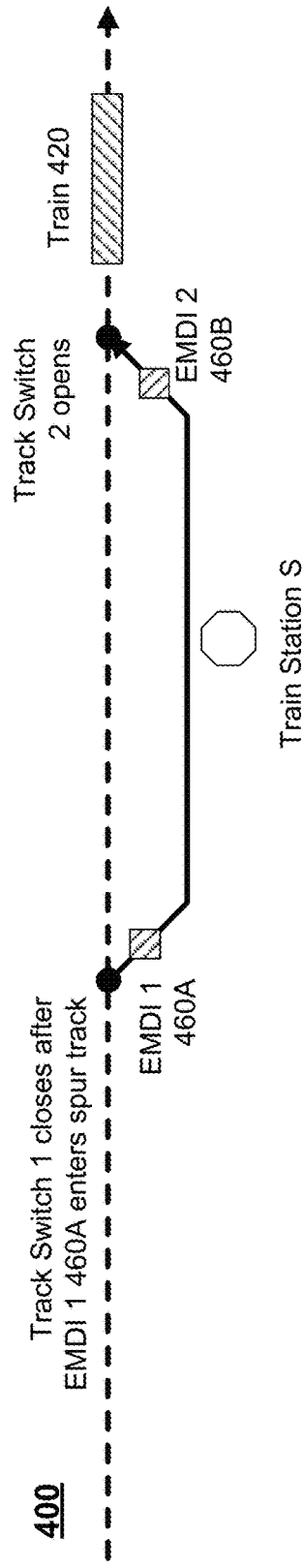
Figure 4D:
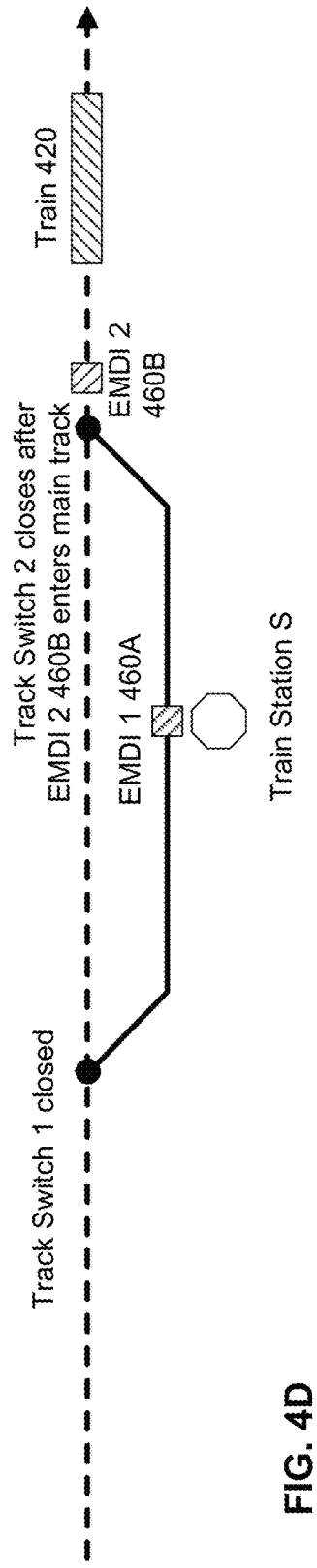
Figure 4E:
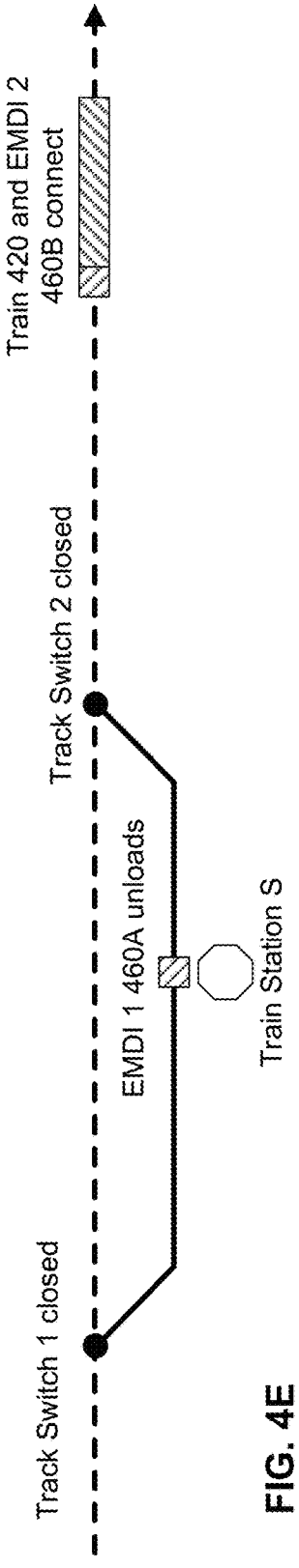

FIG. 3 is a flowchart illustrating a method 300 of operating a rail system 400, which may be as described for rail system 100, with a train and EMDI vehicles such as train 220 and EMDI 260, and FIGS. 4A to 4E illustrate various states of rail system 400 resulting from the steps of method 300. The following description of the operation of a rail system, such as system 100 or 200, will reference these figures. In FIG. 3, a series of steps or operations are shown for each of: a railway 410 (such as railway 110, 210, with spur track and switches); a train (such as train 120, 220); a first EMDI; and a second EMDI (each EMDI such as EMDI 160, 260). Some steps or operations for a given component of the system are sequenced with respect to specific steps or operations for other component(s) of the system, while others can be timed to be independent of some steps or operations for other component(s), as will be made clear in the following description.

In an initial state of the rail system, as shown in FIG. 4A, train 420 is traveling left to right along track railway 410 (also referred to for this discussion as main track), with a first EMDI 460 A (also referred to for this discussion as EMDI 1) coupled to the train. A first switch 413 (also referred to for this discussion as switch 1), connecting spur track 412 to railway 410 on a first side of station S is in an open state (i.e. a vehicle traveling on railway 410 will continue on railway 410 as it crosses switch 413, and will not be diverted onto spur track 412), as is a second switch 415 that connects spur track 412 to railway 410 on a second side of station S.

In a first, optional, step of the flow for EMDI 1, i.e. step C1 302, passengers who wish to reach station S, if on the train, rather than already being on the EMDI 1, exit the train 420 to board EMDI 1 460A (e.g. move from a passenger compartment of a passenger car, through a passenger passage, and into a passenger compartment of EMDI 1 460A, such as described above for rail system 200). In step C1 304, EMDI 1 460A decouples from the train 420, and then in step C1 306, EMDI 1 460A decelerates—this creates spacing between the train 420 and EMDI 1 460A.

In a first step T 302 for the train 420, it passes switch 1. Then, in step T 304, the train 420 decelerates so that it will be moving at a lower speed in preparation for coupling with EMDI 2 460B.

In a first step for the railway 410, at step R 302, after the train 420 has passed switch 1 but before EMDI 1 460A has reached switch 1, switch 1 is changed from a closed state (i.e. a vehicle traveling on railway 410 will stay on main track across switch 1, and cannot access spur track 412) to an open state (i.e. a vehicle traveling on railway 410 will be diverted by switch 413 onto spur track 412).

In parallel with the operations described above, at a first step for EMDI 2 460B, step C2 302, passengers at station S who wish to ride on the train 420 embark EMDI 2 460B from the station S. In a next step C2 304, EMDI 2 460B leaves the station on the spur track 412, and accelerates towards the main track. The rail system 400 is now in the state shown in FIG. 4B.

In step C1 308, EMDI 1 460A reaches switch 1, and exits the main track onto the spur track 412, heading towards station S. In step R 304, switch 1 is changed from an open state to a closed state, in preparation for the next train 420 that travels down the main track. In step T306, the train 420 passes switch 2, and in step R 306 switch 2 is changed from a closed state to an open state. The rail system 400 is now in the state shown in FIG. 4C.

In step C1 310, EMDI 1 460A enters the station S, and stops. In step C1 312, passengers disembark from EMDI 1 460A into the station S. Meanwhile, EMDI 2 460B exits the spur track 412 onto the main track at step C2 306, and at step C2 308, EMDI 2 460B accelerates towards the train 420. At step R308, switch 2 is changed from an open state to a closed state, in preparation for the next train 420 that travels down the main track. The rail system is now in the state shown in FIG. 4D.

In step C2 310, EMDI 2 460B reaches, and couples to, the train 420. In step T 308, the train 420 accelerates back towards its steady state speed, heading towards the terminus T. In optional state C2 312, passengers may exit EMDI 2 460B and enter a passenger car of the train 420, such as by a passenger passage. The rail system is now in the state shown in FIG. 4E.

Advantageously, each EMDI is functionally interchangeable with any other EMDI, and each train (locomotive, passenger car(s), etc.) is functionally interchangeable with any other train. Thus, in the method 300, EMDI 1 460A can function as EMDI 2 460B for a subsequent train 420. For example, after passengers have disembarked from EMDI 1 460A, that EMDI can embark other passengers from the station S, and become EMDI 2 460B in the method 300, starting at step C2 302. A subsequent train can then become the train operating on the main track, from which a different EMDI is decoupled at step C1 304 and which passes switch 1 at step T 302. The method 300 can then continue as described above, with the original EMDI 1 460A ultimately coupling to the subsequent train at step C2 310.

Figure 5A:
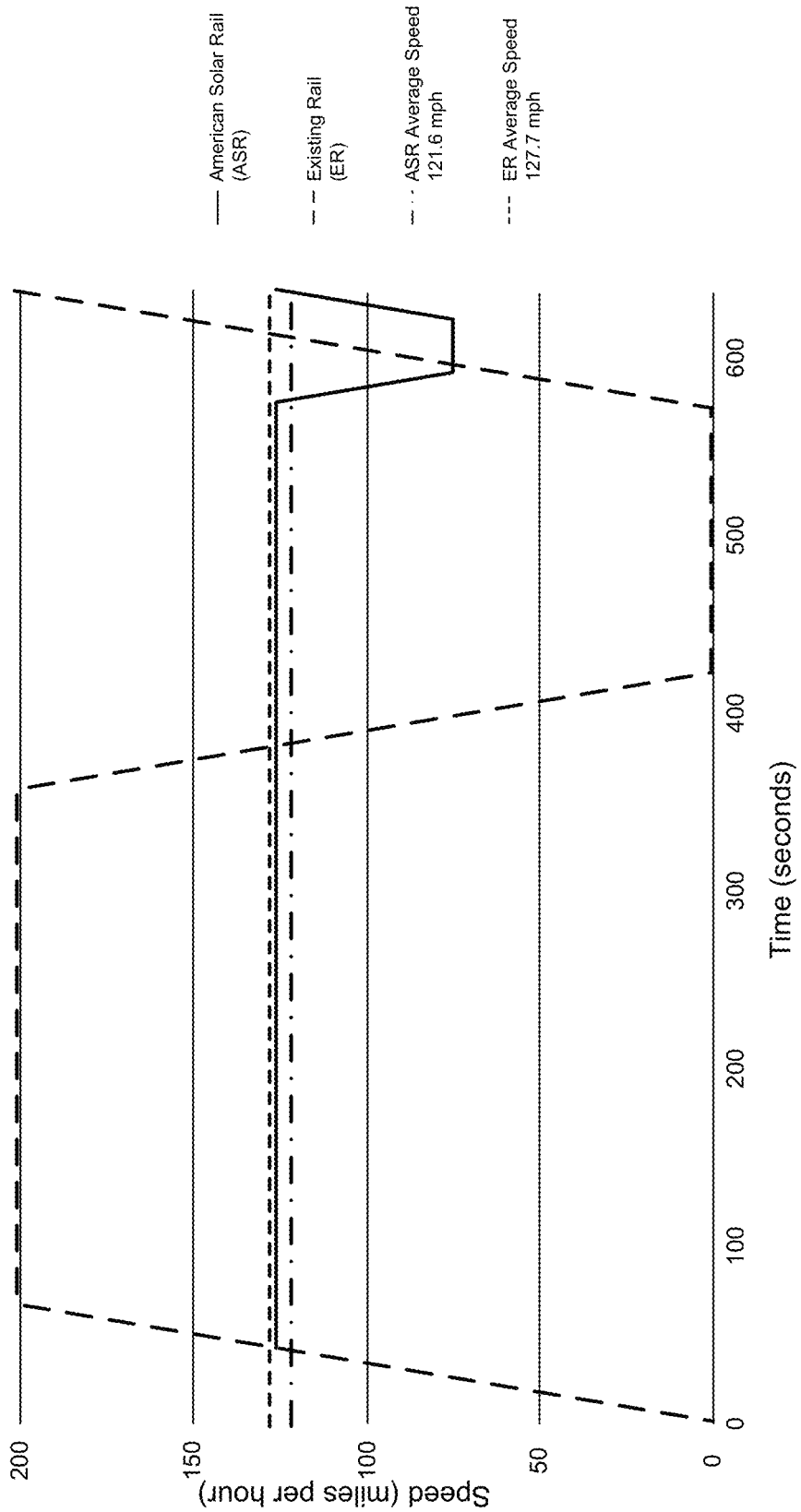
FIGS. 5A and 5B are graphical comparisons of the performance of a conventional high-speed rail system and a rail system according to embodiments herein.
Figure 5B:
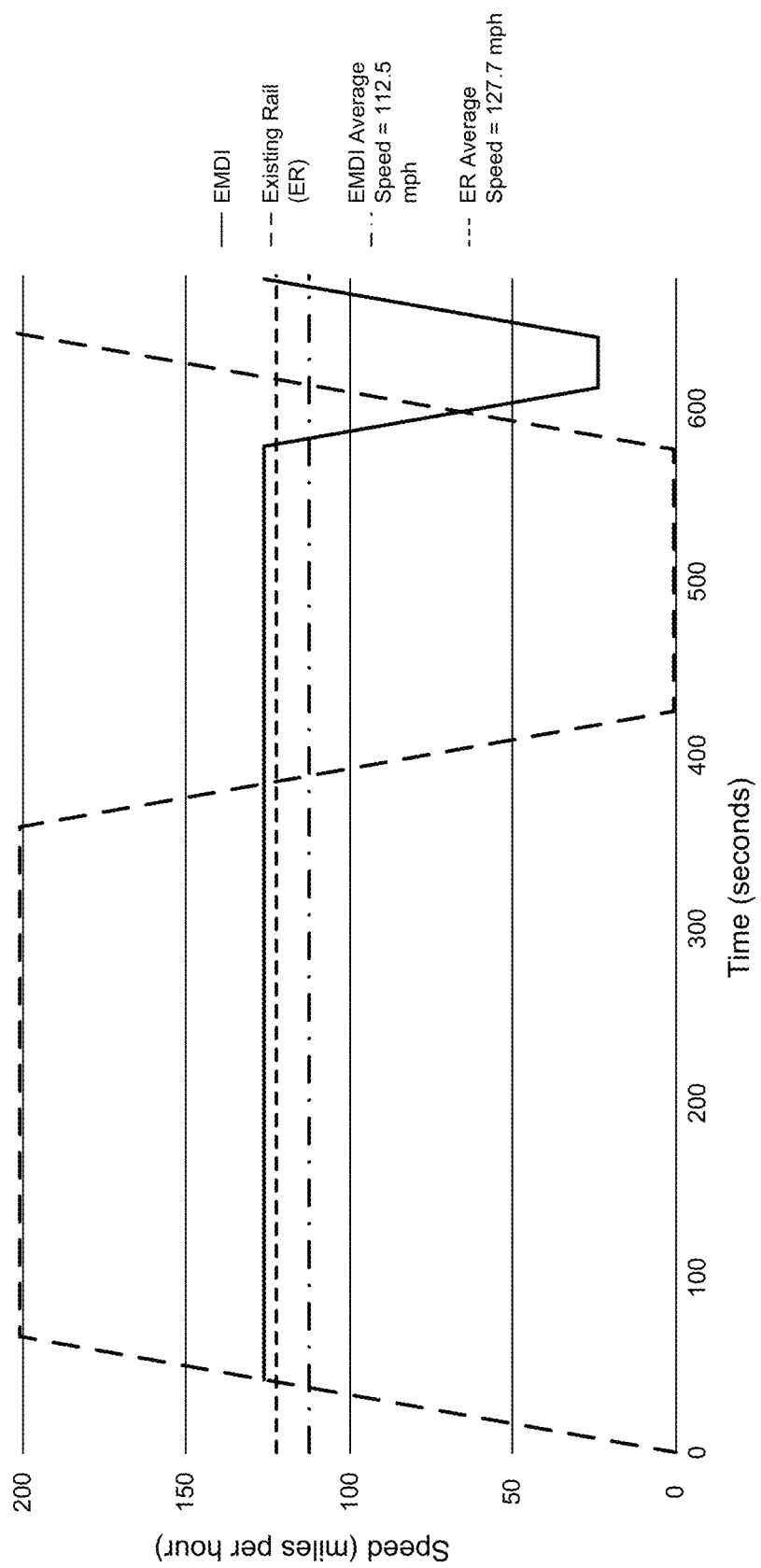
Figure 6:
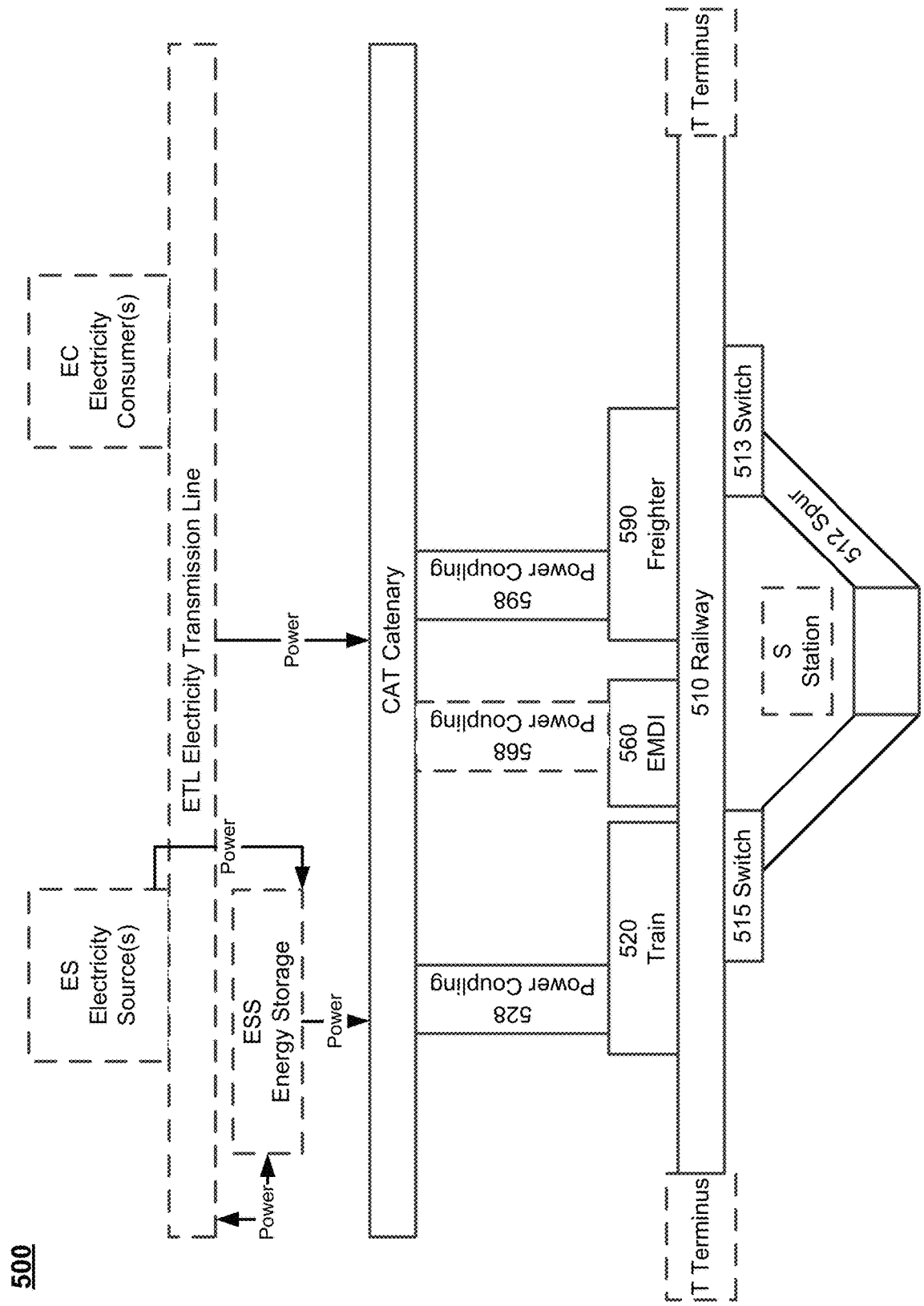
FIG. 6 is a schematic illustration of a rail system incorporating a freighter, according to an embodiment.

The advantages of the method and system described above over a conventional high-speed rail system are described with reference to FIGS. 5A and 5B. In these illustrations, a conventional high speed rail system is assumed to have trains, and track (such as class 9 track), capable of sustained train operation at speed of 200 mph with an acceleration/deceleration rate of 3 mph/s. A rail system according to an embodiment consistent with those disclosed above is assumed to have trains, and track (such as class 7 track) capable of sustained train operation at 126 mph, and to have the same acceleration and deceleration capabilities as the conventional train. Both systems are assumed to have a first station at any suitable distance from a starting terminus. In each system, a train is stationary at a terminus, travels to the first station to embark/debark passengers, and departs the first station, accelerating to its respective steady-state speed. For the conventional rail system, a dwell time at the first station, with the train stationary to disembark/embark passengers, is assumed to be 150 seconds. For the rail system of the disclosed embodiment, the train is assumed to slow to 75 mph for the illustration in FIG. 5A, and to 25 mph for the illustration in FIG. 5B, and maintain that lower speed for 30 seconds, to couple with a EMDI departing from the first station to join the train. The speed vs. time trace for the conventional system is shown by the red solid lines in FIGS. 5A and 5B, and for the inventive system is shown by the green solid lines in FIGS. 5A and 5B. The total elapsed time shown is 642 seconds, which is the time between each train departing from the terminus and reaching its sustained operating speed after exchanging passengers at the first station. As shown by the red and green dashed lines, the average speed of the conventional train over this elapsed time is 127.7 mph, and for the and the inventive train is 121.6 mph in the illustration shown in FIG. 5A (with a coupling speed of 75 mph) and 112.5 mph in the illustration shown in FIG. 5B (with a coupling speed of 25 mph). Although operating at a slightly lower average speed than the conventional rail system, the inventive rail system is much less expensive, because it can be based on conventional Class 7 track, and requires a less capable (and expensive) locomotive.

Embodiments and methods herein describe the coupling and/or decoupling of any number of, for example, EMDIs to cars of a moving train. The releasable coupling can be made using any suitable technique or method. Similarly, any suitable control system can be employed to control and/or adjust relative velocities, alignments, forces, etc. As discussed in more detail above, any aspects of the control system that are involved in the process of coupling or decoupling can be completely autonomous (i.e. without human intervention) or can have human control or input for some or all aspects of the process(es). In some embodiments, some aspects of the process do not need any control input, e.g., those aspects may result automatically from interaction of mechanical components. In some embodiments, a coupler or coupling mechanism can include one or more clamping systems, magnetic couplings, solid steel latching, and/or any other suitable coupler, connector, etc., or combinations thereof. In some implementations, the systems and methods described herein can employ one or more sensors or devices configured to guide and/or at least partially control the coupling. For example, in some implementations, a laser-guided and/or magnetic-guided system with any number of sensors can be employed to provide and/or otherwise result in data allowing the releasable coupling of EMDIs to other cars of a train. Moreover, such couplers and/or coupling systems can include components capable of meeting all safety requirements of the FRA and reliability (e.g., including weather sealing and/or other required and/or recommended preventive maintenance, protection, and/or safety methods).

In some implementations, any of the cars of a train and/or an EMDI vehicle can include alignment sensors to ensure mechanical and/or magnetic couplers make an aligned coupling every time. The sensor(s) can be laser distance measuring sensors (laser DME) attached, for example, to a coupler (e.g., the coupler 270 on the EMDI 260) and configured to seek a specific point on the end of a corresponding coupling mechanism which exists on the train (e.g., the train 220).

In some implementations, any of the cars of a train and/or an EMDI vehicle can include magnetic pre-couplers/post laser DME sensors setting pre-coupling alignment, magnetic pre-couplers can be configured to trigger electromagnets to pull one or more couplers or coupling mechanisms into alignment between the EMDI vehicle and a car (e.g., a passenger car) of a train.

In some implementations, any of the cars of a train and/or an EMDI vehicle can include one or more hook couplers including a steel latching hook mechanism sufficient to connect the train car(s) to the EMDI (e.g., via a semi rigid connection). Once the connection is secure and verified, passengers and/or freight can move or can be moved to/from the EMDI to/from the train.

In some implementations, any of the cars of a train and/or an EMDI vehicle can include one or more forward motion sensors (FMS) such as, for example, accelerometers or the like mounted to the locomotive and first cars that can sense sudden lurching or lateral motions. If a motion (or a change in motion or acceleration) is registered, the FMS can send a signal to an alignment sensor or the like, which can have logic and/or can otherwise execute instructions to decide whether to terminate a hook-up or release to continue.

A variety of known coupling mechanisms may be suitable for use with the inventive system. For example, known multi-function couplers (MFCs) or fully automatic couplers, make all connections (mechanical, air brake, and electrical) between rail vehicles, without human intervention. Commercially available designs include the Scharfenberger coupler, various knuckle hybrids such as the Tightlock, Wedgelock, and Dellner couplings, as well as the coupling available from Faiveley Transport (formerly Bergische Stahl Industrie (BSI)) and the Schaku-Tomlinson Tightlock coupling. Other suitable couplers including the Westinghouse H2C coupler (widely used on the subway cars of the New York City Subway) and the WABCO N-Type coupler (sometimes referred to as a pin and couple coupler or spear coupler). Another is the Tomlinson coupler (consisting of two squared metal hooks that engage with each other in a larger rectangular frame with air line connections above and below), which is the most widely used fully automatic heavy rail coupling in North America, adopted by mass transit systems including the Washington Metro, Massachusetts Bay Transportation Authority, Los Angeles Metro Rail, and MARTA Rail. The Scharfenberg coupler, probably the most commonly used type of fully automatic coupling, is widely used on transit and regular passenger service trains in Europe. The Schaku coupler enables coupling with low relative closing speeds between the two vehicles to be coupled (e.g. less than 2 mph) and thus relatively low shock.

The feasibility of automatic and remote control of coupling and uncoupling of freight cars has been established, though at very low speeds (below 2 mph), and such control is contemplated for use with the inventive system. In particular, the use of a tri-coupler, remote-controlled angle cock (RCAC) and remote-controlled cut-lever (RCCL) together to couple and uncouple cars is described in "Remote Coupling and Uncoupling of Freight Cars," US Department of Transportation, Federal Railroad Administration Research Results RR 08-29, December 2008, the disclosure of which is incorporated by reference herein. The use of such technology is envisioned here for significantly higher coupling speeds for freight cars than previously known, as well as for the novel application to high speed coupling for passenger cars (e.g. the EMDI).

In general, the higher the speed at which coupling takes place, for a given class of rail (Class 7, Class 8, etc.), the more challenging and complex the coupling process can be, and the greater the need for sensors and control mechanisms to ensure a safe and reliable coupling. For example, at higher coupling speeds, there can be more relative motion, and higher components of velocities and accelerations for that motion, between the two vehicles to be coupled and thus the two sides of the coupling mechanism, in directions orthogonal to the overall direction of motion of the vehicles (i.e. along the rails). Note that this consideration is primarily applicable to coupling operations—decoupling operations are less sensitive to relative motion/velocity/acceleration. Higher classes of rail are rated for higher vehicle speeds in part because there is a higher degree of precision in the alignment of the rails, and greater stability while under loading from moving vehicles. As described above in more detail, higher classes of rail are much more expensive to construct. It may therefore be beneficial, and it is contemplated in some embodiments of the inventive system, to use lower class rail (e.g., Class 7) for most of the railway (including the main track and spur tracks), but to use higher class rail (e.g., Class 8 or Class 9) for the portion of the railway over which coupling operations would be conducted. This portion would be near each of the switches that selectively couple the spur tracks to the main track for an EMDI to join to a train after departing a station. Thus, a relatively small percentage of the track in the overall railway of the rail system) would be the materially more expensive, higher class rail, maintaining an average cost per mile of the overall railway close to the cost per mile of the lower class track. Alternatively, or in addition, the average speed of the vehicles during a coupling operation can be maintained at a sufficiently low value that the relative motion/velocity/acceleration across the two halves of the coupling can be maintained at sufficiently low values that relatively simple coupling control mechanisms can be used. Thus, for example, coupling operations can be reliably and safely conducted at a speed such as 25 mph with relatively simple, known coupling mechanisms and control systems on a Class 7 track, whereas coupling operations conducted at 75 mph on the same track would require more complex coupling mechanisms and control systems.

In some embodiments, the rail system may be used to transport freight and/or passengers by vehicles other than trains, operating between stations and/or end-to-end between terminuses, to increase the utilization of the system and extend the system's energy efficiencies to other transportation modalities. Thus, for example, a catenary-based electric freight truck (such as those developed by Siemens) can be fitted with wheels that can operate on the track of the rail system, can have a pantograph or other power coupling that can interact with the catenary of the rail system, and can thus operate on the track in the same manner as the trains. Operation of such a truck can by coordinated with, i.e. not interfere with, the operation of the trains (e.g., controlled by the controller 280 shown in FIG. 2B). In some implementations, the rail trucks can carry heavier loads of freight in a carbon-free and/or reduced-carbon manner and at higher speeds for less cost per mile than existing road-based heavy trucks. In some implementations, any other devices and/or methods of increasing track utilization, selling charging electricity, supplying freight warehouse(s) and/or distribution centers at the stations and terminuses, and/or the like can be utilized. Such embodiments are described below in more detail with reference to FIGS. 6 to 9.

While various embodiments have been described herein, textually and/or graphically, it should be understood that they have been presented by way of example only, and not limitation. Likewise, it should be understood that the specific terminology used herein is for the purpose of describing particular embodiments and/or features or components thereof and is not intended to be limiting. Various modifications, changes, enhancements, and/or variations in form and/or detail may be made without departing from the scope of the disclosure and/or without altering the function and/or advantages thereof unless expressly stated otherwise. Functionally equivalent embodiments, implementations, and/or methods, in addition to those enumerated herein, will be apparent to those skilled in the art from the foregoing descriptions and are intended to fall within the scope of the disclosure.

For example, while rail systems 100, 200, 300, and/or 400 are described herein as being used with particular devices and/or in particular situations, it should be understood that they have been presented by way of example only and not limitation. The embodiments and/or devices described herein are not intended to be limited to any specific implementation unless expressly stated otherwise. For example, in some implementations, a rail system can include and/or can be used with any suitable number of EMDIs. In some implementations, each car included in a train (other than the locomotive) can be and/or can function as a EMDI such as those described herein. In some implementations, a EMDI can be designed to be loaded with freight. The freight can be loaded based upon, for example, a desired drop location. In such implementations, a EMDI can be dropped (e.g., decoupled from the remaining portion(s) of the train) based upon reaching the destination of the freight and the train continues uninterrupted, i.e. freight is delivered without stopping the train. Moreover, in some such implementations, a number of EMDIs can be releasably coupled to the train and arranged in a serial fashion such that the last EMDI of the train is the first EMDI that is decoupled to provide freight (or people) to a desired station, depot, warehouse, facility, etc.

In other embodiments, other types of vehicles may be operated on the rail system, using electric power from the catenary CAT, which can include some or all of the functionality of vehicles described above, and perform specific functions. For example, as shown schematically in FIG. 6, a rail system 500 can include the same devices as rail systems 100, 200, 300, and 400, but can also include a freighter (or freight train, or EMDI freighter) 590. Freighter 590 can operate on the same railway 520 (to travel between terminuses T and to/from stations S via spurs 512), operating on electrical energy from catenary CAT received via power coupling 598 (e.g. a pantograph device). Freighter 590 can include many of the same systems as, and operate similarly to train 520, and/or EMDI 560. However, freighter 590 may be dedicated to carriage of freight, such as containerized freight transported in an intermodal container (or shipping container), which may be carried on flat cars and/or well cars. Such cars may be coupled to a freighter locomotive, and they collectively form freighter 590. Freighter 590 can operate independently on the rails of rail system 500, thus operating similarly to a train 520, which can be the same as any of the trains described above. In some embodiments, freighter 590 is not configured to operate with an EMDI such as EMDI 560. In some embodiments, freighter 590 can operate as an EMDI, i.e. can be selectively coupled to and uncoupled from a train such as train 520 to access stations such as station S while allowing train 520 to maintain a relatively high speed while coupling/uncoupling.

Figure 7:
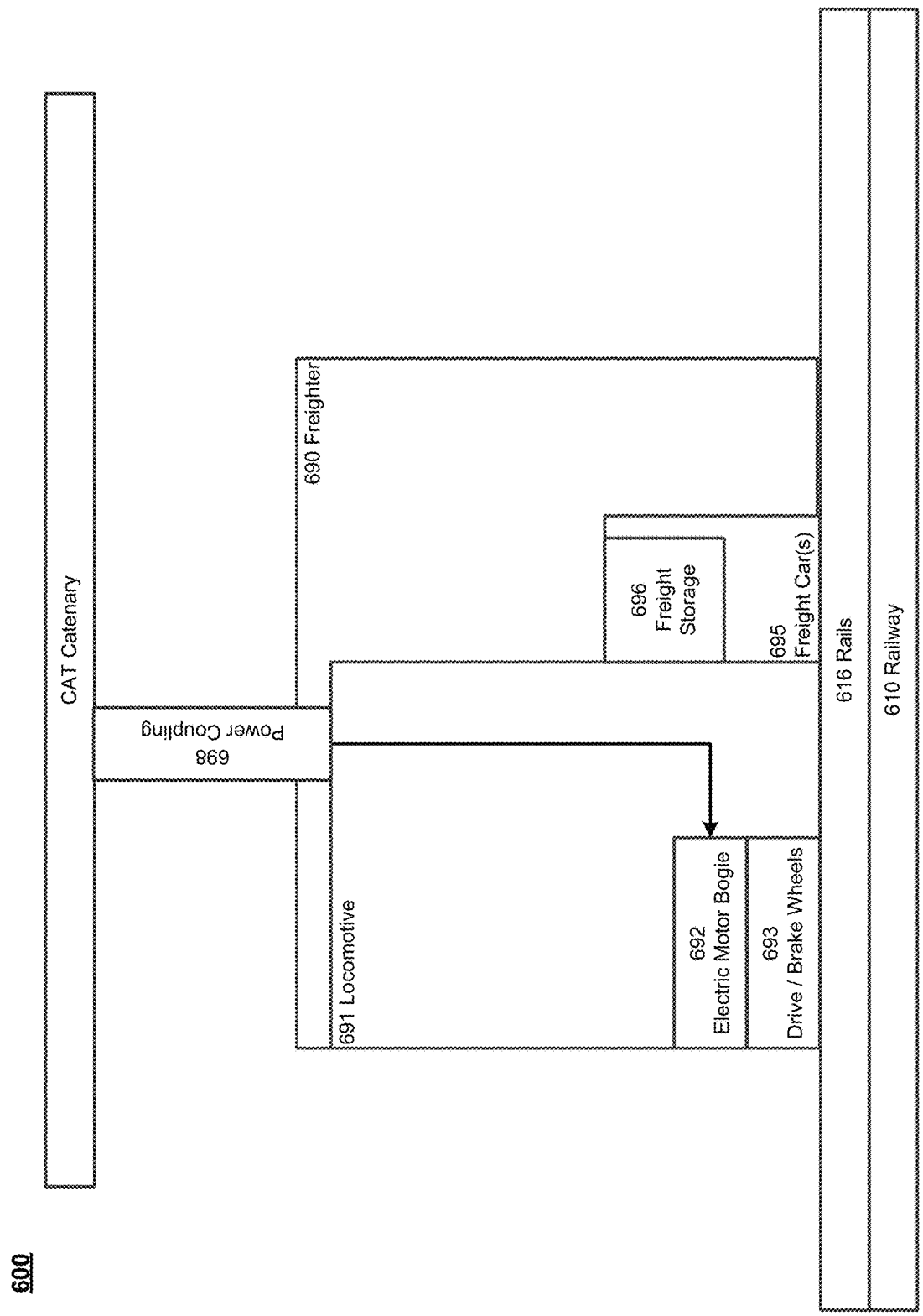
FIG. 7 is a schematic illustration of a freighter, according to an embodiment.

A freighter 690 is shown schematically as part of a rail system 600 in FIG. 7. Freighter 690 includes a freight locomotive 691 and one or more freight cars 695, each having the capability to carry freight storage (such as one or more intermodal containers) 696. Freight locomotive 691 may include one or more electric motor bogies 692, each including drive/brake wheels 693 configured to ride on rails 616 of railway 610. Electric motor bogie 692 can draw electrical power from catenary CAT via power coupling 698.

Figure 8:
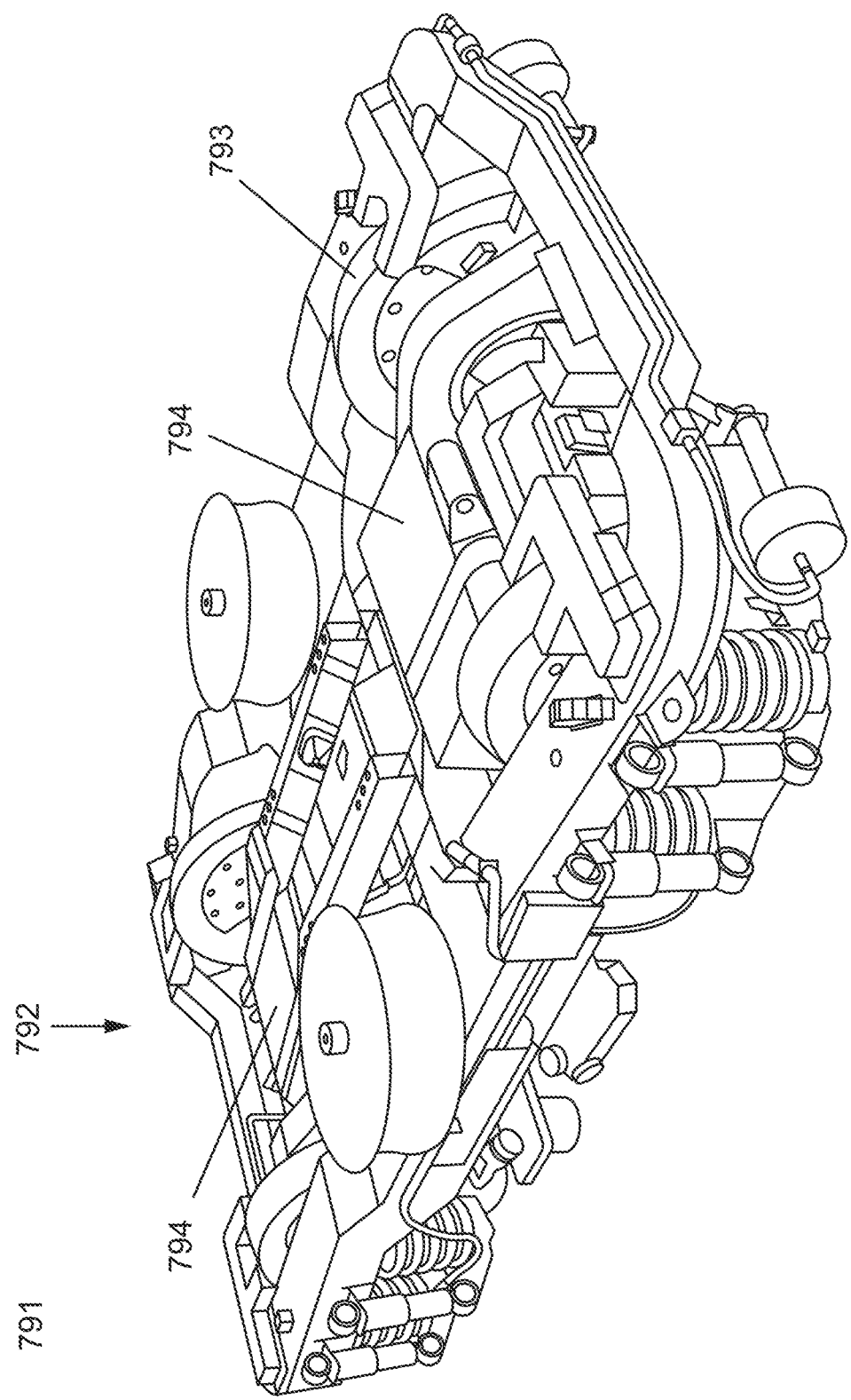
FIG. 8 is a perspective view of an electric motor bogie, according to an embodiment.

One suitable example of an electric motor bogie is shown in FIG. 8. One or more electric motor bogies 792 can be included in a freighter locomotive 791 to provide motive and braking force to the freighter locomotive 791 (and associated freight cars). As shown in FIG. 8, electric motor bogie 792 can include one or more wheels 793 (e.g. with two wheels 793 mounted onto each of two axles). Each pair of wheels 793 may be driven by an electric motor 794. Electric motor bogie may include other conventional components, as shown in FIG. 8, including a bogie frame, suspension components, brakes, etc.

Figure 9:
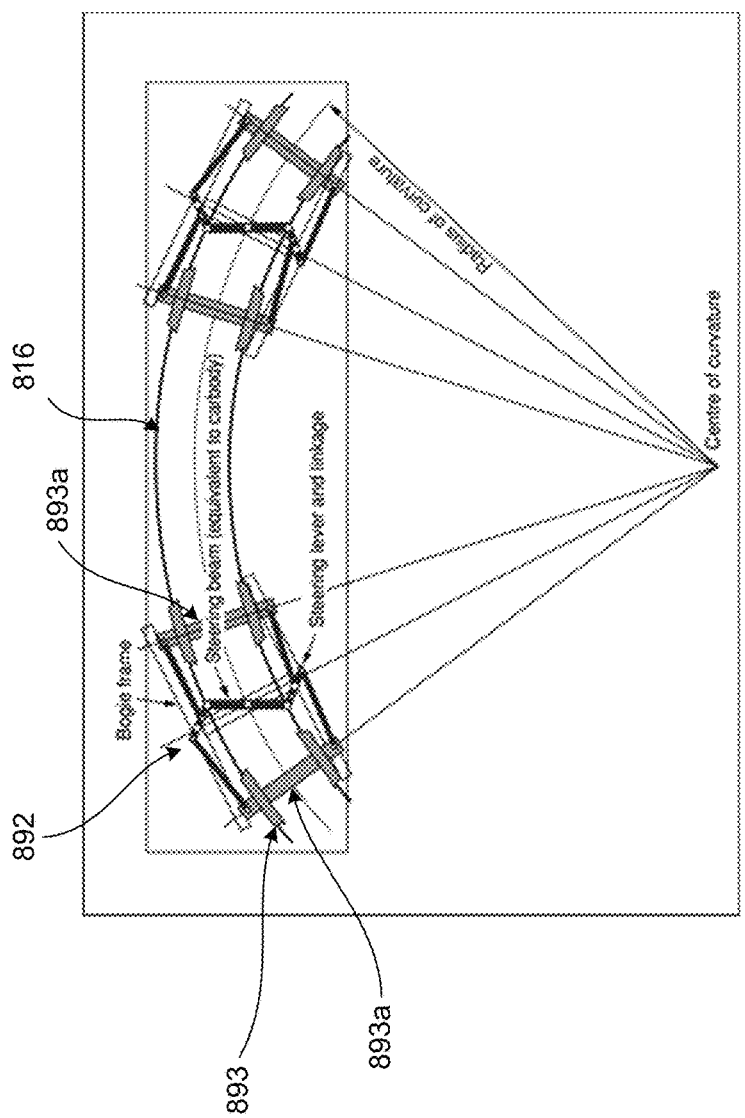
FIG. 9 is a schematic illustration of a motor bogie having steerable wheels, according to an embodiment.

A conventional bogie frame is turned into a curve of the rails on which it rides by the leading wheelset (wheels and axle) as it is guided by the rails. However, there is a degree of slip and substantial force required to allow the change of direction. In some embodiments, to accommodate handling of curves on the railway at the high speeds at which the freighter advantageously travels, an electric motor bogie may include steerable wheels/axles. Such an arrangement is shown schematically in FIG. 9 for a freighter 890. As shown in FIG. 9, electric motor bogie 892 includes two pairs of wheels 893 mounted on axles 893a. Each axle is mounted to the bogie frame for pivotal movement, and the axles are coupled to a steering beam via steering levers and linkages.

Thus, the axis of each axle can be aligned with the center of curvature of a curve in the rails 816, reducing wheel wear and bogie frame stress.

The inventive system, methods, and components described above enable dramatic improvement in operating efficiencies for rail systems. The overall efficiency of a rail system employing the EMDI (and thus able to have the train maintain a high average speed) can be 30% or more than that of a conventional rail system, and correspondingly the rail system can allow for about 30% more load capacity from the rail tracks or the entire rail track network. Overall energy efficiency is also dramatically higher than conventional rail systems by using solar energy to provide the electric power to the motor/generator for the traction wheels—the efficiency of the propulsion system can be up to 90%, whereas conventional locomotives that burn diesel fuel to drive alternators to provide electricity to the drive motors for the traction wheels operate at about 35% efficiency. Using solar energy reduces the overall cost of fuel (equivalent) per mile by up to 70%. Relatedly, the operation of a rail system such as disclosed herein can operate at approximately 97% $CO_2$ free. The economics of operation of a system such as disclosed herein can also be much more attractive for the owner of the rail system relative to a conventional rail system because the operator can own the energy source, and particularly, a renewable energy source such as photovoltaic solar arrays. The owner can thereby produce its own energy for use on the rail system (and/or so sell to other energy consumers) rather than buying fuel such as diesel.

Where schematics, embodiments, and/or implementations described above indicate certain components arranged and/or configured in certain orientations or positions, the arrangement of components may be modified, adjusted, optimized, etc. The specific size and/or specific shape of the various components can be different from the embodiments shown and/or can be otherwise modified, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise. By way of example, in some implementations, a size of a EMDI can be based at least in part on the cargo carried by the EMDI; a size and/or capability of a loading and/or offloading station; height, width, and/or weight permitted by regional regulations, class of rail, etc.; and/or based on any other suitable factor.

Although various embodiments have been described as having particular characteristics, functions, components, elements, and/or features, other embodiments are possible having any combination and/or sub-combination of the characteristics, functions, components, elements, and/or features from any of the embodiments described herein, except mutually exclusive combinations or when clearly stated otherwise. For example, any of the rail systems 100, 200, 300, and/or 400 described above can include and/or can be combined with a freight vehicle(s), existing rail infrastructure, existing electrical system infrastructure, and/or the like.

Where methods described above indicate certain events occurring in certain order, the ordering of certain events may be modified. Additionally, certain of the events may be performed concurrently in a parallel process when possible, as well as performed sequentially as described above. While methods have been described as having particular steps and/or combinations of steps, other methods are possible having a combination of any steps from any of methods described herein, except mutually exclusive combinations and/or unless the context clearly states otherwise.

What is claimed is:

1. A method of operating a rail system, the rail system having:
   a main track,
   a spur track connected to the main track by a switch changeable between a closed state in which a vehicle traveling on the main track will stay on the main track across the switch, and cannot access the spur track, and an open state in which a vehicle traveling on the main track can be diverted from the main track onto the spur track,
   a station spaced from the main track and accessible by the spur track
   a train with a locomotive and a passenger car coupled, directly or indirectly, behind the locomotive, and
   an embarkation/disembarkation (EMDI) vehicle releasably coupleable, directly or indirectly, behind the passenger car,
   in a first state of the rail system the switch being in the closed state, the train moving along the main track in a direction of travel toward the switch and the station, at a first speed, the EMDI vehicle being coupled to the passenger car, and a passenger being carried by the EMDI vehicle,
   the method comprising:
   providing electric energy from an energy storage of the EMDI vehicle to at least one of an energy storage or a motor of the locomotive;
   decoupling the EMDI vehicle from the moving passenger car;
   decelerating the EMDI vehicle to a second speed, less than the first speed, creating a separation between the EMDI vehicle and the passenger car;
   after the train has moved past the switch, but before the EMDI vehicle has reached the switch, the switch then being changed from its closed state to its open state, diverting the EMDI vehicle from the main track to the spur track via the switch; and
   further decelerating the EMDI vehicle to a stop at the station.

2. The method of claim 1, further comprising disembarking the passenger from the EMDI vehicle into the station.

3. The method of claim 1, wherein before the decoupling the EMDI vehicle, the rail system is in a second state in which the passenger is carried in the passenger car, the method further comprising:
   receiving the passenger into the EMDI vehicle from the moving passenger car by a passenger passage coupled to the EMDI vehicle.

4. The method of claim 1, wherein:
   the train is a first train, the locomotive is a first locomotive, the passenger car is a first passenger car, and the passenger is a first passenger,
   the switch being a first switch, the spur track being further connected to the main track by a second switch on the opposite side of the station from the first switch, the second switch being changeable between a closed state in which a vehicle traveling on the spur track cannot access the main track and an open state in which a vehicle traveling on the spur track can access the main track,
   the rail system further includes a second train having a second locomotive and a second passenger car, and
   the rail system being in a second state in which the second switch is in its closed state the second train is moving along the main track in the direction of travel at a third speed, less than the first speed, and a second passenger is located in the station, the method further comprising:

embarking the second passenger from the station onto the EMDI vehicle;

accelerating the EMDI vehicle on the spur track toward the second switch;

after the second train has moved past the second switch, the switch then being changed from its closed state to its open state, exiting the EMDI vehicle from the spur track onto the main track via the second switch, behind the second train;

accelerating the EMDI vehicle to a fourth speed, higher than the third speed;

reducing a distance between the EMDI vehicle and the second train until the EMDI vehicle reaches the second passenger car;

mechanically coupling the EMDI vehicle to the second passenger car via a mechanical coupling;

electrically coupling the EMDI vehicle to the second passenger car via a power coupling; and providing electric energy from the energy storage of the EMDI vehicle to at least one of an energy storage or a motor of the second locomotive.

5. The method of claim 4, further comprising discharging the second passenger from the EMDI vehicle into the second passenger car via a passenger passage coupled to the EMDI vehicle.

6. The method of claim 1, wherein the EMDI vehicle is releasably coupleable, directly or indirectly, behind the passenger car while the train is moving at the first speed.

7. A method of operating a rail system, the rail system having:
a main track,
a spur track connected to the main track by a first switch and a second switch disposed on opposite sides of a station, the station spaced from the main track and accessible by the spur track,
the first switch changeable between a closed state in which a vehicle traveling on the spur track cannot access the main track and an open state in which a vehicle traveling on the spur track can access the main track,
a train with a locomotive and at least one passenger car coupled, directly or indirectly, behind the locomotive, and
an embarkation/disembarkation (EMDI) vehicle releasably coupleable, directly or indirectly, behind the passenger car,
in a first state of the rail system the first switch being in the closed state, the train moving along the main track in a direction of travel in which the first switch is past the station, at a first speed, the EMDI vehicle being disposed on the spur track adjacent to the station, and a passenger is located in the station,
the method comprising:
embarking the passenger from the station onto the EMDI vehicle;
accelerating the EMDI vehicle on the spur track toward the first switch;
after the train has moved past the first switch, the first switch then being changed from its closed state to its open state, exiting the EMDI vehicle from the spur track onto the main track via the first switch, behind the train;
accelerating the EMDI vehicle to a second speed, higher than the first speed;

reducing a distance between the EMDI vehicle and the train until the EMDI vehicle reaches the passenger car;
coupling the EMDI vehicle to the passenger car; and
providing electric energy from an energy storage of the EMDI vehicle to at least one of an energy storage or a motor of the locomotive.

8. The method of claim 7, further comprising discharging the passenger from the EMDI vehicle into the passenger car via a passenger passage coupled to the EMDI vehicle.

9. A method of operating a rail system, the rail system having:
a main track,
a spur track connected to the main track at two separated locations by a first switch and a second switch
the first switch being changeable between a closed state in which a vehicle traveling on the main track will stay on the main track across the switch, and cannot access the spur track, and an open state in which a vehicle traveling on the main track can be diverted from the main track onto the spur track,
the second switch being changeable between a closed state in which a vehicle traveling on the spur track cannot access the main track and an open state in which a vehicle traveling on the spur track can access the main track,
a station spaced from the main track, accessible by the spur track, and disposed between the first switch and the second switch,
a train with a locomotive and a passenger car coupled, directly or indirectly, behind the locomotive,
a first embarkation/disembarkation (EMDI) vehicle being releasably coupleable, directly or indirectly, behind the passenger car, and
a second EMDI vehicle being releasably coupleable, directly or indirectly, behind the passenger car,
in a first state of the rail system each of the first switch and the second switch being in its closed state, the train moving along the main track in a direction of travel in which the second switch is past the first switch, at a first speed, the first EMDI vehicle being coupled to the passenger car, a first passenger being carried by the EMDI vehicle, and a second passenger located in the station,
the method comprising:
providing electric energy from an energy storage of the first EMDI vehicle to at least one of an energy storage or a motor of the locomotive;
before the train reaches the first switch, decoupling the first EMDI vehicle from the passenger car;
after the first EMDI vehicle has decelerated to a speed less than the first speed, creating a separation between the first EMDI vehicle and the passenger car, the train has passed the first switch but the first EMDI vehicle has not reached the first switch, the first switch has changed from its closed state to its open state, and the first EMDI vehicle has diverted from the main track onto the spur track via the first switch, decelerating the train from the first speed to a second speed, lower than the first speed;
after the train has moved past the second switch, after the second switch has changed from its closed state to its open state, after the second EMDI vehicle has embarked the second passenger from the station, left the station on the spur track, and entered the main track from the spur track via the second switch, accelerated to a third speed, higher than the second speed, and reduced a distance between the second EMDI vehicle and the train until the second EMDI vehicle reaches the passenger car, coupling the second EMDI vehicle to the passenger car;

providing electric energy from an energy storage of the second EMDI vehicle to at least one of the energy storage or the motor of the locomotive; and accelerating the train from the second speed to the first speed.

10. The method of claim 9, further comprising receiving the second passenger into the passenger car from the second EMDI vehicle via a passenger passage coupled to the second EMDI vehicle.

11. The method of claim 9, wherein before the decoupling the first EMDI vehicle, the method further comprising receiving the first passenger into the first EMDI vehicle from the passenger car by a passenger passage coupled to the first EMDI vehicle.

12. A method of operating a rail system, the rail system having:
a main track,
a spur track connected to the main track at two separated locations by a first switch and a second switch,
the first switch being changeable between a closed state in which a vehicle traveling on the main track will stay on the main track across the switch, and cannot access the spur track, and an open state in which a vehicle traveling on the main track can be diverted from the main track onto the spur track,
the second switch being changeable between a closed state in which a vehicle traveling on the spur track cannot access the main track and an open state in which a vehicle traveling on the spur track can access the main track,
a station spaced from the main track, accessible by the spur track, and disposed between the first switch and the second switch,
a train with a locomotive and a passenger car coupled, directly or indirectly, behind the locomotive,
a first embarkation/disembarkation (EMDI) vehicle being releasably coupleable, directly or indirectly, behind the passenger car, and
a second EMDI vehicle being releasably coupleable, directly or indirectly, behind the passenger car,
in a first state of the rail system each of the first switch and the second switch being in its closed state, the train moving along the main track in a direction of travel in which the second switch is past the first switch, at a first speed, the first EMDI vehicle being coupled to the passenger car, a first passenger being carried by the first EMDI vehicle, and a second passenger located in the station,
the method comprising:
providing electric energy from an energy storage of the first EMDI vehicle to at least one of an energy storage or a motor of the locomotive;
after the first EMDI vehicle has been decoupled from the passenger car and decelerated to a speed less than the first speed, creating a separation between the first EMDI vehicle and the passenger car, and after the train has passed the first switch but the first EMDI vehicle has not reached the first switch, causing the first switch to change from its closed state to its open state, enabling the first EMDI vehicle to be diverted from the main track onto the spur track via the first switch;
after the train has moved past the second switch, but before the second EMDI vehicle, which has embarked the second passenger from the station and left the station on the spur track moving towards the second switch, has reached the second switch, causing the second switch to move from its closed position to its open position, enabling the second EMDI vehicle to enter the main track from the spur track via the second switch, behind the train;
mechanically and electrically coupling the second EMDI to the passenger car; and
providing electric energy from an energy storage of the second EMDI vehicle to at least one of the energy storage or the motor of the locomotive.

13. The method of claim 12, wherein after the first EMDI vehicle has diverted from the main track onto the spur track via the first switch, the method further comprising causing the first switch to change from its open state to its closed state.

14. The method of claim 12, wherein after the second EMDI vehicle has entered the main track from the spur track via the second switch, the method further comprising causing the second switch to change from its open state to its closed state.

15. The method of claim 1, wherein the EMDI is releasably coupleable to the passenger car via a mechanical coupling and a power coupling, the providing electric energy from the energy storage of the EMDI to the at least one of the energy storage or the motor of the locomotive includes providing electric energy between the EMDI and the train via the power coupling.

16. The method of claim 7, wherein the EMDI is releasably coupleable to the passenger car via a mechanical coupling and a power coupling, the providing electric energy from the energy storage of the EMDI to the at least one of the energy storage or the motor of the locomotive includes providing electric energy between the EMDI and the train via the power coupling.

17. The method of claim 9, wherein each of the first EMDI and the second EMDI is releasably coupleable to the passenger car via a mechanical coupling and a power coupling.

18. The method of claim 17, wherein the providing electric energy from the energy storage of the first EMDI to the at least one of the energy storage or the motor of the locomotive includes providing electric energy between the first EMDI and the train via the power coupling; and
the providing electric energy from the energy storage of the second EMDI to the at least one of the energy storage or the motor of the locomotive includes providing electric energy between the second EMDI and the train via the power coupling.

19. The method of claim 12, wherein the mechanically and electrically coupling the second EMDI to the passenger car includes mechanically coupling the second EMDI to the passenger car via a mechanical coupling and electrically coupling the second EMDI to the passenger car via a power coupling.

20. The method of claim 12, wherein the providing electric energy from the energy storage of the first EMDI to the at least one of the energy storage or the motor of the locomotive includes providing electric energy between the first EMDI and the train via the power coupling; and
the providing electric energy from the energy storage of the second EMDI to the at least one of the energy storage or the motor of the locomotive includes providing electric energy between the second EMDI and the train via the power coupling.

* * * * *